(12) United States Patent
Wendlandt et al.

(10) Patent No.: US 9,697,304 B1
(45) Date of Patent: Jul. 4, 2017

(54) CONFIGURABLE COMPOSITE CONNECTOR

(75) Inventors: Jeffrey M. Wendlandt, Newton, MA (US); Andrew C. Bennett, Cambridgeshire (GB)

(73) Assignee: The MathWorks, Inc., Natick, MA (US)

( * ) Notice: Subject to any disclaimer, the term of this patent is extended or adjusted under 35 U.S.C. 154(b) by 925 days.

(21) Appl. No.: 13/433,066

(22) Filed: Mar. 28, 2012

(51) Int. Cl.
*G06F 7/60* (2006.01)
*G06F 17/10* (2006.01)
*G06F 17/50* (2006.01)

(52) U.S. Cl.
CPC ...... *G06F 17/5009* (2013.01); *G06F 2217/74* (2013.01)

(58) Field of Classification Search
CPC .................... G06F 17/5009; G06F 2217/74
USPC ............................................................ 703/2
See application file for complete search history.

(56) References Cited

U.S. PATENT DOCUMENTS

| | | | | |
|---|---|---|---|---|
| 7,433,812 | B2 * | 10/2008 | Shakeri et al. | 703/15 |
| 7,558,705 | B1 * | 7/2009 | Hughes et al. | 703/1 |
| 7,752,559 | B1 * | 7/2010 | Szpak et al. | 715/764 |
| 7,873,500 | B1 | 1/2011 | Brewton et al. | |
| 8,667,407 | B1 * | 3/2014 | Szpak et al. | 715/764 |
| 2013/0116986 | A1 * | 5/2013 | Zhang et al. | 703/2 |

OTHER PUBLICATIONS

Simulink® 6 Using Simulink®: User's Guide, The MathWorks, Inc., 2007.*

"What is a Composite Signal? : Guy and Seth on Simulink," The MathWorks, Inc., <http://blogs.mathworks.com/seth/2008/03/27what-is-a-composite-signal/>.Mar. 27, 2008, pp. 1-7.

"Simulink®: User's Guide," The MathWorks, Inc., Apr. 2011, pp. i-lviii, 1-1 to 1-46, 2-1 to 2-78, 3-1 to 3-138, 4-1 to 4-32, 5-1 to 5-84, 6-1 to 6-30, 7-1 to 7-38, 8-1 to 8-122, 9-1 to 9-34, 10-1 to 10-16, 11-1 to 11-46, 12-1 to 12-18, 13-1 to 13-82, 14-1 to 14-12, 15-1 to 15-10, 16-1 to 16-44, 17-1 to 17-35, 18-1 to 18-56, 19-1 to 19-22, 20-1 to 20-80, 21-1 to 60, 22-1 to 22-46, 23-1 to 23-26, 24-1 to 24-233, 25-1 to 25-70, 26-1 to 26-26, 27-1 to 27-88, 28-1 to 28-43, 29-1 to 29-98, 30-1 to 30-96, 31-1 to 31-27, 32-1 to 32-26, 33-1 to 33-32, A-1 to A-4, Index-1 to Index-22.

"Simscape™: User's Guide: R2011b," The MathWorks, Inc., Sep. 2011, pp. 1-203.

* cited by examiner

*Primary Examiner* — Aniss Chad
(74) *Attorney, Agent, or Firm* — Cesari and McKenna, LLP; Michael R. Reinemann

(57) ABSTRACT

A graphical model may include a plurality of graphical objects representing physical elements, and connections between graphical objects may be represented by physical connection lines. A set of physical connections between two or more graphical objects may be configured as belonging to a group. A switching unit may toggle the graphical model between a single-line display mode and a multi-line display mode. In the multi-line display mode, each of the individual physical connection lines linking two or more graphical objects are displayed in the model. In response to user or other input, the switching unit may redraw the graphical model in single line mode in which the individual physical connections configured as a group are replaced with a single, composite connection line. The graphical model may be executable to simulate the physical system, and the execution may be unaffected by the display mode.

40 Claims, 22 Drawing Sheets

CONFIGURABLE COMPOSITE CONNECTOR

BRIEF DESCRIPTION OF THE DRAWINGS

The invention description below refers to the accompanying drawings, of which.

DETAILED DESCRIPTION OF AN ILLUSTRATIVE EMBODIMENT

Overview

Figure 1:
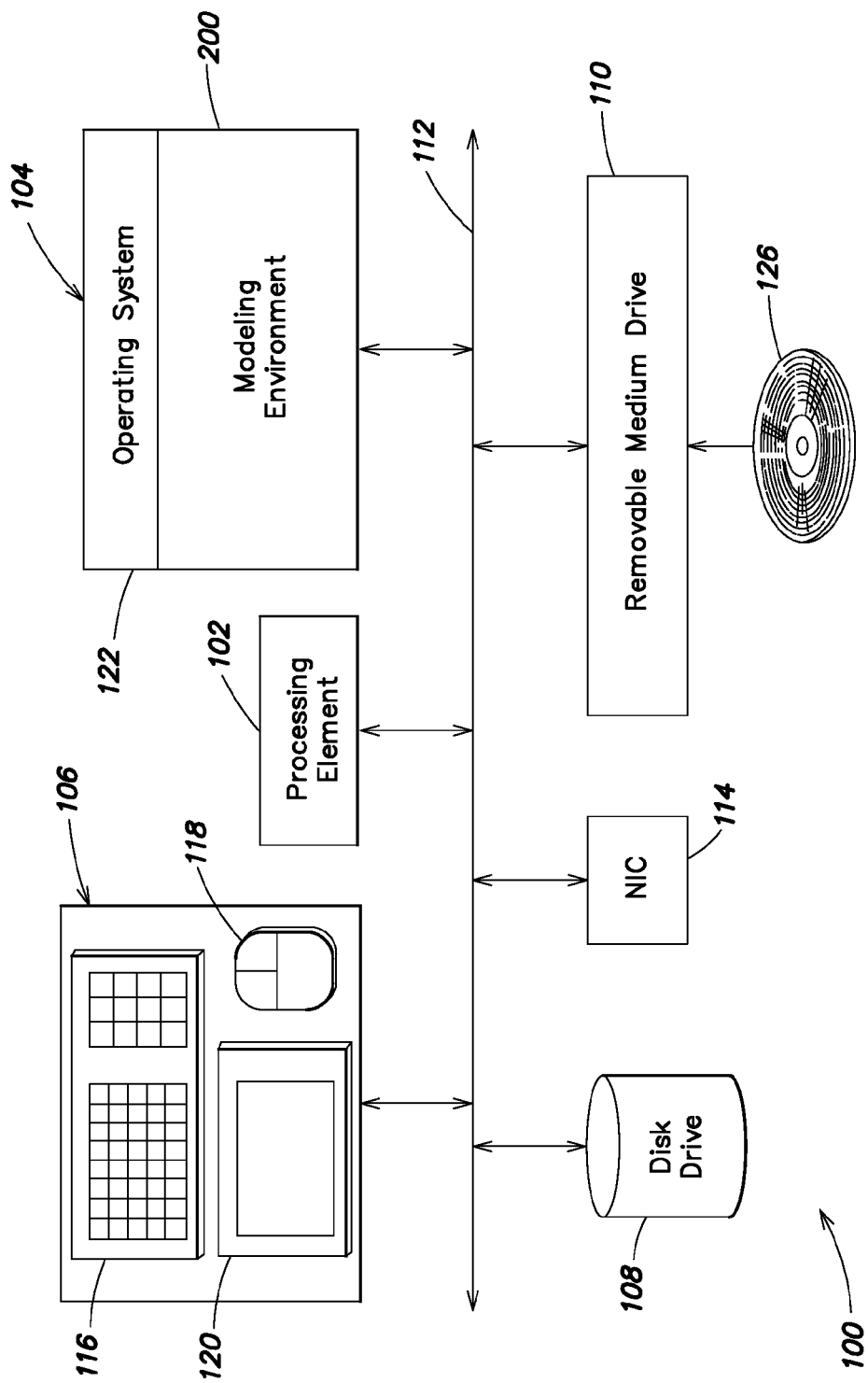
FIG. 1 is a schematic block diagram of a data processing system suitable for use with the present invention.

Exemplary embodiments of the present invention may be used to facilitate the creation and simulation of computer generated, graphical models. The model may represent, at least in part, a physical system. A modeling environment for use in constructing and simulating models may include a user interface engine, a model editor, a physical modeling toolbox, and a simulation engine. The model editor may include a connector tool that, in turn, includes a switching unit. The simulation engine may include an interpreter, and a model compiler having an intermediate representation (IR) builder. The physical modeling toolbox may provide a plurality of graphical objects that represent physical components. Other toolboxes may provide graphical objects that represent dynamic systems, operations, functions, state elements, etc. The model editor may provide an editor window having a canvas. A user may select particular graphical objects from the toolboxes, and place them on the canvas to construct or edit a model. The user may also connect selected objects presented on the canvas using connection symbols, such as lines, arrows, etc., to define a physical topology of the system being modeled.

Connections that link graphical objects representing physical systems or components typically represent physical connections between those systems or components. A given physical connection may have a plurality of sub-elements. For example, an electrical connection may have a plurality, such as three, phases where each phase is a sub-element of the electrical connection. In an embodiment, a plurality of physical connection ports of a graphical object may be configured, for example through the setting of one or more object properties, as belonging to a group. The switching unit causes the model editor to display connection symbols presented on the canvas in either a single-line display mode or a multi-line display mode. If a connection between two or more graphical objects represents multiple sub-elements, and the switching unit is set to single-line display mode, then only a single, composite connection symbol, for example, a single physical connection line, is displayed in the model between the objects. If the switching unit is set to multi-line display mode, then multiple individual connection symbols, for example one individual physical connection line per sub-element of the connection, are displayed in the model between the objects.

In an embodiment, the switching unit may be configured to operate at multiple levels, such as a model level, a subsystem level, a connection level, and a port level. When the switching unit operates in the model level, then all of the connections in the model having multiple sub-elements are displayed in either the single-line display mode or the multi-line display mode. When the switching unit operates in the subsystem level, then the display of connections of a first subsystem of the model may be presented in the single-line mode, while the connections of a second subsystem may be presented in the multi-line mode. When the switching unit operates in the connection level, a first connection in the model or a subsystem may be represented by a single connection symbol, while a second connection in the model or subsystem may be represented by multiple connection symbols. When the switching unit operates in the port level, one end of a connection may be represented by a single connection symbol while another end of the same connection may be represented by multiple connection symbols.

The model editor may be configured to alter the number of connection ports of graphical objects based on the current display mode. For example, if a connection having multiple sub-elements (or one of its ends) is presented in the single-line display mode, the model editor may provide a single connection port at the graphical object. If a connection (or one of its ends) is presented in the multi-line display mode, the model editor may provide a plurality of connection ports at the graphical object, for example one port per individual connection symbol.

The physical modeling toolbox may include an interface object that may be added to a model. An interface object may be placed on a connection presented on the canvas, and may appear as a block. The interface object translates a single composite connection symbol into a plurality of individual connection symbols. For example, the interface object may have a first interface that interfaces to the single composite connection symbol and a second interface that interfaces to plurality of individual connection symbols. The interface object may thus represent a transition point between the composite connection symbol and the plurality of individual connection symbols.

The physical modeling toolbox also may include one or more simulated fault objects. Such objects may be added to a model to evaluate how the physical system represented by the model reacts to various faults. By connecting a simulated fault object to one of the separate individual connection symbols, a simulated fault may be introduced only into the sub-element represented by the selected individual connection symbol. The simulated fault object does not introduce a fault into the sub-elements represented by the other individual connection symbols.

FIG. 1 is a schematic illustration of a computer or data processing system 100 for implementing and utilizing an embodiment of the invention. The computer system 100 includes one or more processing elements, such as a processing element 102, a main memory 104, user input/output (I/O) 106, a data storage unit, such as a disk drive 108, and a removable medium drive 110 that are interconnected by a system bus 112. The computer system 100 may also include a communication unit, such as a network interface card (NIC) 114. The user I/O 106 may include a keyboard 116, a pointing device, such as a mouse 118, and a display 120. Other user I/O 106 components include voice or speech command systems, and other pointing devices include touchpads and touchscreens. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 104 may store a plurality of program libraries or modules, such as an operating system 122, and one or more application programs that interface to the operating system 122, including a modeling environment application 200.

The removable medium drive 110 may accept and read a computer readable medium 126, such as a CD, DVD, floppy disk, solid state drive, tape, flash memory or other medium. The removable medium drive 110 may also write to the computer readable medium 126.

Suitable computer systems include personal computers (PCs), workstations, laptops, tablets, palm computers, smart phones, electronic readers, and other portable computing devices, etc. Nonetheless, those skilled in the art will understand that the computer system 100 of FIG. 1 is intended for illustrative purposes only, and that the present invention may be used with other computer systems, data processing systems, or computational devices. The present invention may also be used in a networked, e.g., client-server, computer architecture, or a public and/or private cloud computing arrangement. For example, the modeling environment application 200 may be hosted on a server, and accessed by a remote client through an application hosting system, such as Remote Desktop Connection from Microsoft Corp.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating systems, among others.

As indicated above, a user or developer, such as an engineer, scientist, programmer, etc., may utilize one or more input devices, such as the keyboard 116, the mouse 118, and the display 120 to operate the modeling environment 200, and construct one or more models of a system that is being designed or evaluated. The models may be computational and may have executable semantics. In particular, the models may be executable. The execution of a model may simulate operation of the system that is being designed or evaluated.

In an embodiment, the modeling environment 200 is a high-level modeling environment. Suitable high-level modeling environments include the MATLAB® and Simulink® technical computing environments from The MathWorks, Inc. of Natick, Mass., as well as the Simscape™ physical modeling system and the Stateflow® charting tool also from The MathWorks, Inc., the MapleSim physical modeling and simulation tool from Waterloo Maple Inc. of Waterloo, Ontario, Canada, the LabVIEW programming system from National Instruments Corp. of Austin, Tex., the Visual Engineering Environment (VEE) from Agilent Technologies, Inc. of Santa Clara, Calif., the PSS®E power system simulator for engineering tool from Siemens AG of Erlangen, Germany, the PSCAD® electromagnetic time domain transient simulation environment, the PowerFactor power system analysis software from DigSILENT GmbH of Gormaringen, Germany, the System Studio model-based signal processing algorithm design and analysis tool from Synopsys, Inc. of Mountain View, Calif., the SPW signal processing algorithm tool from Synopsis, a Unified Modeling Language (UML) system, a Systems Modeling Language (SysML) system, the System Generator system from Xilinx, Inc. of San Jose, Calif., and the graphical modeling system described in U.S. Pat. No. 7,324,931 for Conversion of Model Components Into References, and U.S. Pat. No. 7,991,598 for Method and System for Modeling a Mechanical System, which are hereby incorporated by reference in their entireties, among others. Models created in the high-level modeling environment may contain less implementation detail, and thus operate at a higher level than certain programming languages, such as the C, C++, C#, FORTRAN, and SystemC programming languages.

Those skilled in the art will understand that the MATLAB® technical computing environment is a math-oriented, textual programming environment for digital signal processing (DSP) design, among other uses. The Simulink® technical computing environment is a graphical, block-based, model-based design environment for modeling and simulating dynamic systems, among other uses. The MATLAB and Simulink tools provide a number of high-level features that facilitate algorithm development and exploration, and support model-based design. Exemplary high-level features include dynamic typing, array-based operations, data type inferencing, sample time inferencing, and execution order inferencing, among others. The Simscape add on program and its component libraries provide tools for graphically modeling and simulating physical elements, such as mechanical, electrical, and hydraulic elements.

Figure 2:
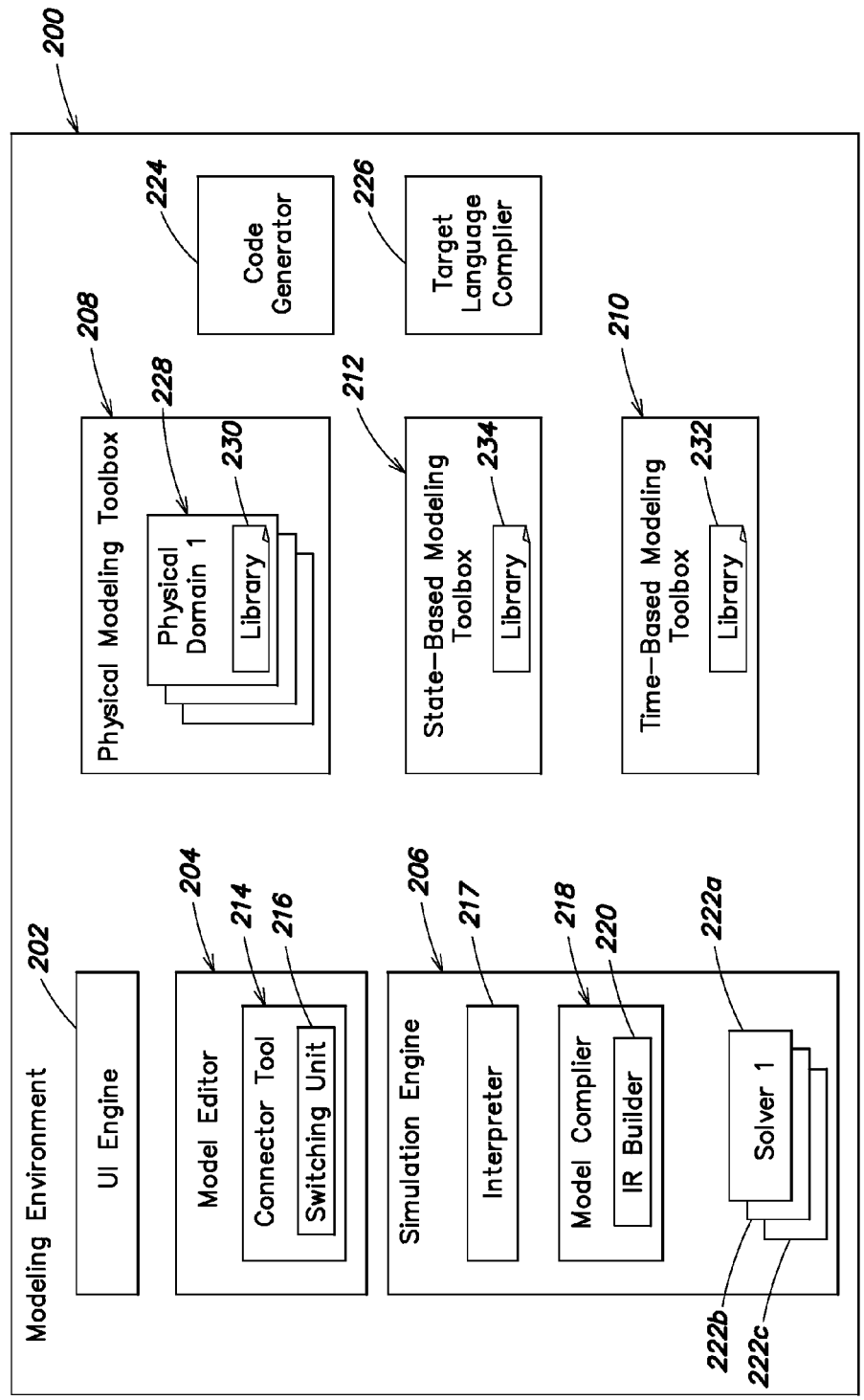
FIG. 2 is a partial functional diagram of a modeling environment in accordance with an embodiment of the present invention.

FIG. 2 is a partial block diagram of an embodiment of the modeling environment 200. The environment 200 may include a user interface (UI) engine 202, a model editor 204, a simulation engine 206, and one or more toolboxes, such as a physical modeling toolbox 208, a time-based modeling toolbox 210, and a state-based modeling toolbox 212. The model editor 204 may include a connector tool 214 that, in turn, may include a switching unit 216. The simulation engine 206 may include an interpreter 217 and a model compiler 218 that, in turn, may include one or more Intermediate Representation (IR) builders, such as IR builder 220. The simulation engine 206 also may include one or more, and preferably a plurality, of solvers, such as solvers 222a-c. Exemplary solvers include one or more fixed-step continuous solvers, which may utilize integration techniques based on Euler's Method or Huen's Method, and one or more variable-step solvers, which may be based on the Runge-Kutta and Dormand-Prince pair. A description of suitable solvers may be found in the *Simulink 7 User's Guide* from The MathWorks, Inc. (September 2011 ed.), which is hereby incorporated by reference in its entirety.

The modeling environment 200 may include other components, such as a code generator 224, and a target language compiler 226. Suitable code generators for use with the present invention include, but are not limited to, the Simulink Coder, the Embedded Coder, and the Simulink HDL Coder products from The MathWorks, Inc., and the TargetLink product from dSPACE GmbH of Paderborn Germany.

The physical modeling toolbox 208 itself may include a plurality of toolboxes for different physical domains, such as toolboxes for an electrical domain, a hydraulic domain, a magnetic domain, a mechanical rotational domain, a mechanical translational domain, a pneumatic domain, and a thermal domain, among others, as indicated generally at 228. Each toolbox 208, 210, 212 may provide one or more libraries or palettes that contain a plurality of predefined graphical object types, which may also be referred to as components. In particular, the different physical domain toolboxes 228 may each include one or more libraries, such as library 230, the time-based modeling toolbox 210 may include library 232, and the state-based modeling toolbox 212 may include library 234. One or more instances of an object type may be selected from a library, and added to a graphical model, for example during model construction or editing.

The components provided by the physical modeling toolbox 208 may be assembled into a physical network using connections among selected components. The connections may represent one or more actual physical connections. Specifically, the components may include connection ports, which may also be referred to as terminals, that are configured to mimic actual physical connection points between elements. The number of connection ports with which a given component is provided may be determined by the number of energy flows that the component exchanges with other components of the model, and may also depend on the component's level of idealization of the actual physical element that it represents. An energy flow may be characterized by one or more variables. For example, an energy flow may be characterized by a through variable and an across variable whose product may specify energy flow in watts. A through variable represents a value that may be measured in series to the component, while an across variable represents a value that may be measured in parallel to the component. In the rotational mechanical domain, the through variable may be force and the across variable may be angular velocity. In the electrical domain, the through variable may be current and the across variable may be voltage.

The resulting graphical model may reflect the structure of a physical system being modeled, rather than a purely mathematical depiction of the system. In addition, the graphical model may be simulated by assembling and solving the equations represented by the model.

The user interface (UI) engine 202, model editor 204, simulation engine 206, physical modeling toolbox 208, time-based modeling toolbox 210, state-based modeling toolbox 212, code generator 224, and target language compiler 226 may each comprise registers and combinational logic configured and arranged to produce sequential logic circuits. In an embodiment, the user interface (UI) engine 202, model editor 204, simulation engine 206, physical modeling toolbox 208, time-based modeling toolbox 210, state-based modeling toolbox 212, code generator 224, and target language compiler 226 may be implemented through one or more software modules or libraries containing program instructions pertaining to the methods described herein. The software modules may be stored on main memory 104 and/or computer readable media, such as computer readable medium 126, and executable by one or more processing elements, such as processing element 102. Other computer readable media, including non-transitory media, may also be used to store and execute these program instructions. In alternative embodiments, various combinations of software and hardware, including firmware, may be utilized to implement the present invention.

Figure 3A:
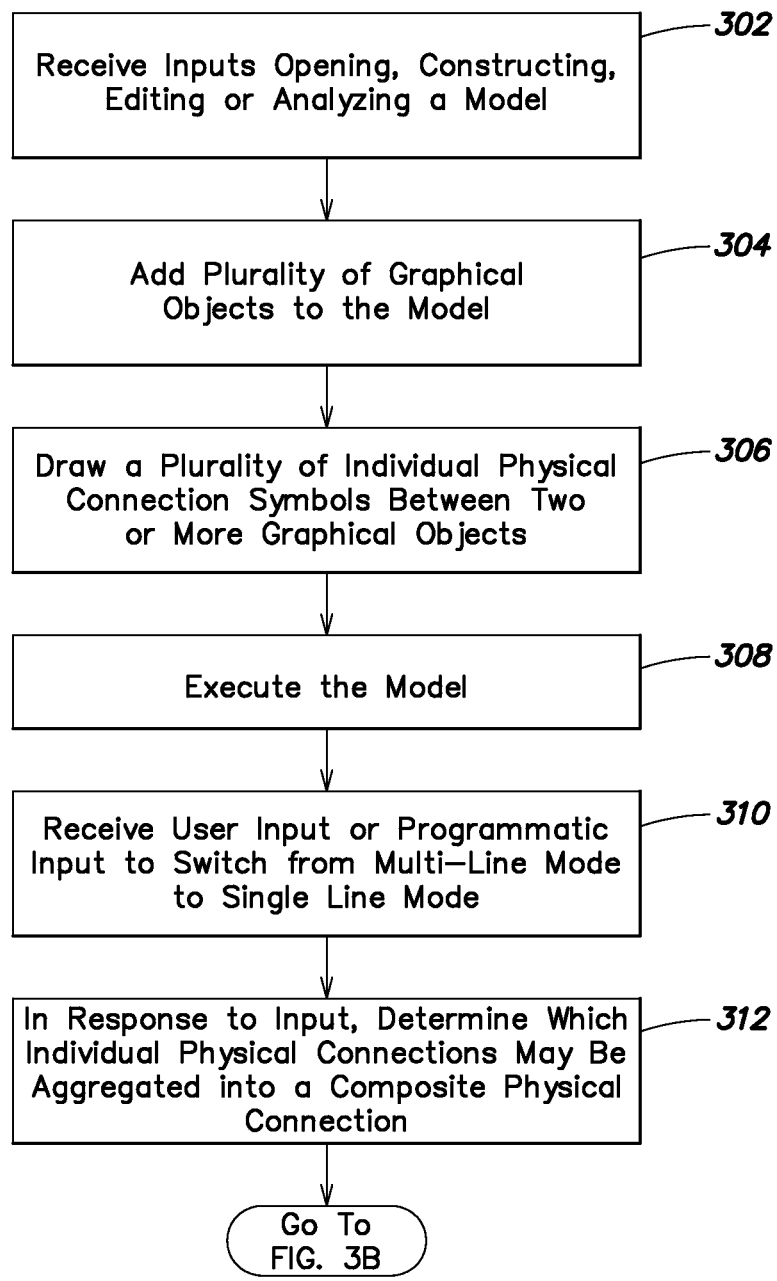
FIGS. 3A-C is a flow diagram of a method in accordance with an embodiment of the present invention.
Figure 3B:
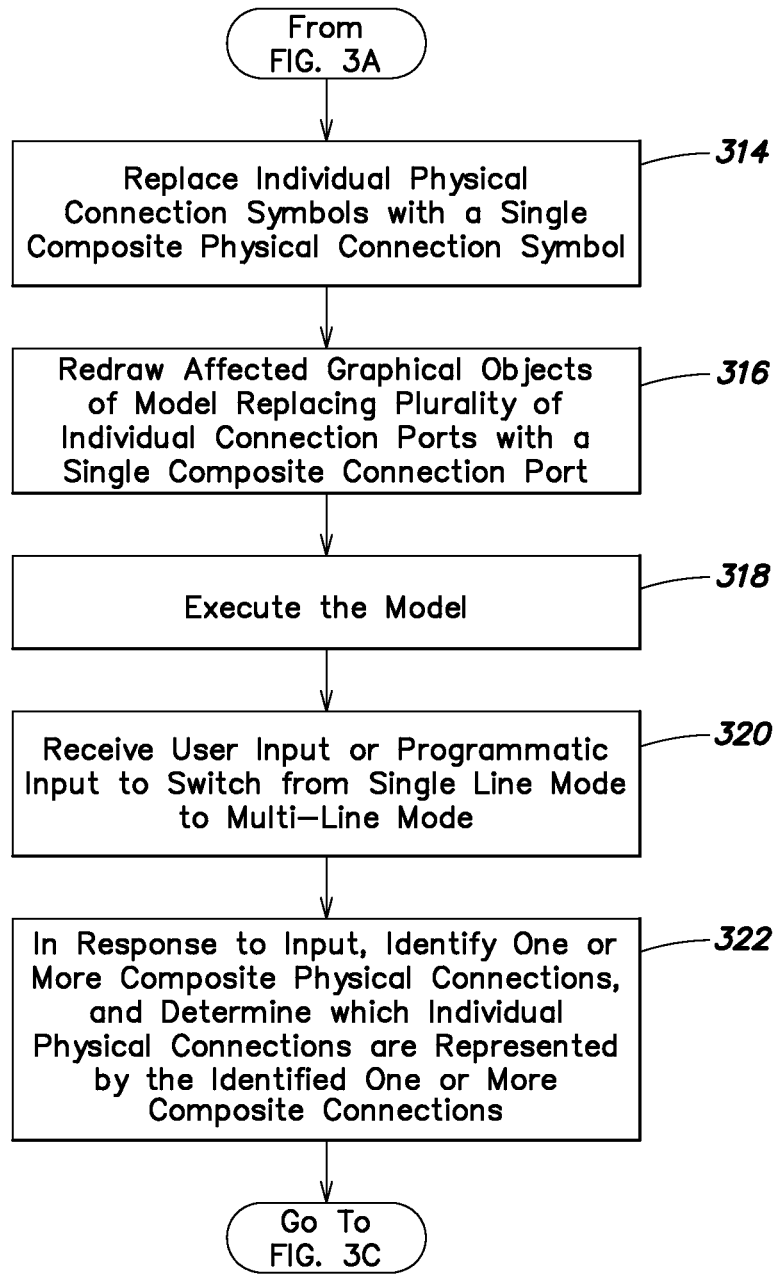
Figure 3C:
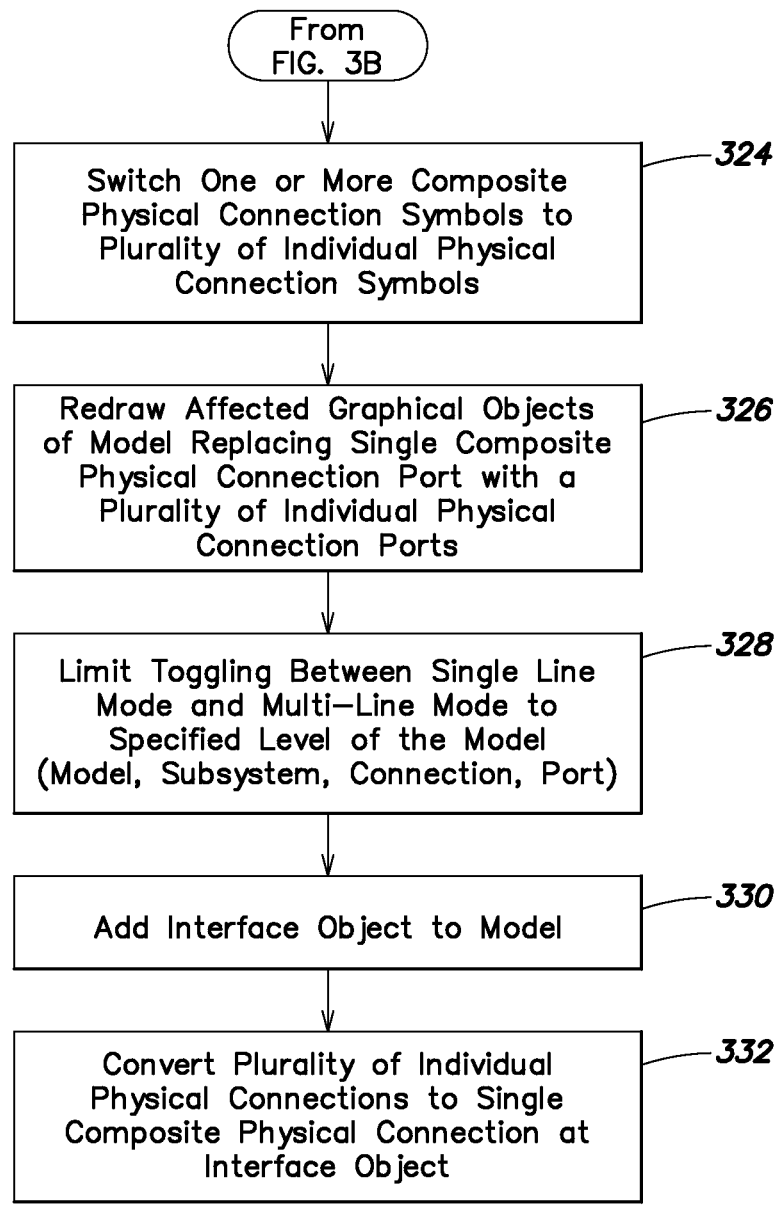

FIGS. 3A-C illustrate a flow diagram of a method in accordance with an embodiment of the invention. The modeling environment 200 may receive inputs from a user opening, constructing, editing, or analyzing a model, as indicated at block 302. The modeling environment 200 may support the creation of graphical, or a combination of graphical and text-based models. The user may operate and interact with the environment 200 through the user I/O 106, such as the keyboard 116, mouse 118, and display 120. For example, the UI engine 202 may present an editor window on the display 120. The editor window may include a menu bar, a tool bar, and a canvas.

In response to further user input, the model editor 204 may add a plurality of graphical objects to the model, as indicated at block 304. Exemplary graphical objects include blocks, icons, and nodes. At least some of the graphical objects may represent physical elements being modeled within the graphical model. For example, as noted, the physical modeling toolbox 208 may provide one or more libraries of graphical object types, that may be selected for inclusion in the graphical model. These graphical objects, moreover, may represent actual physical elements, such as electrical power supplies, electrical motors, hydraulic actuators, planetary gear systems, centrifugal compressors, etc.

At least some of the graphical objects provided by the physical modeling toolbox 208 represent physical elements having a plurality of energy flows that share one or more attributes or characteristics. For example, a first graphical object may represent an electrical element that produces or uses multiple electrical phases, e.g., three, a direct current (DC) electrical element having two electrical poles, or an electrical element having a plurality of cables. A second graphical object may represent a hydraulic element that uses multiple hydraulic pipes. A third graphical object may represent an electro-mechanical element that uses both electrical cables and mechanical linkages. A fourth graphical object may represent a pneumatic element that uses both pneumatic pipes and electrical cables. Furthermore, a connection to such a graphical object may be considered to include a plurality of related sub-elements, one for each of the related energy flows. In addition, these graphical objects may include a plurality of individual connection ports that are associated with these related energy flows. These connection ports may be designated as capable of being combined, that is aggregated, into a group. In an embodiment, one or more object properties may identify a set of energy flows as being related. One or more object properties also may identify a plurality of individual connection ports that form a group and are capable of being aggregated.

The designation of an individual connection port capable of being combined with one or more other connection ports into a group of related connection ports may be specified by the developer of the respective graphical object. In an embodiment, these properties may be hidden, and thus not alterable by a user. In another embodiment, a developer may expose these properties so that a user may set them, thereby allowing the user to specify whether and which individual connection ports form a group.

Attributes or characteristics that may be considered when identifying individual connection ports capable of being combined into a group include physically related ports, such as three electrical phases, six electrical phases, DC, etc. Other attributes or characteristics include component connectivity, e.g., the connections of graphical objects in a model. For example, if graphical object A is electrically and mechanically connected to graphical object B, then the ports of graphical object A may be combinable into a group. Another attribute or characteristic may be geospatial proximity, which may be defined by aggregating graphical objects representing components in geospatial proximity into a subsystem block.

In response to additional user input, the connector tool 214 may draw a plurality of individual physical connection symbols, such as lines, between two or more graphical objects of the model, as indicated at block 306. Each individual physical connection line may represent a physical connection or link between the respective graphical objects of the model. The physical connection lines may represent the exchange of energy flows between the connected objects. The physical connection lines may carry one or more variables, and may have units associated with them. Specifically, each physical connection line may carry an across variable and a through variable. The user also may employ a graphical connection tool, such as a wiring tool, to establish physical connection lines among the blocks.

The connections among graphical objects representing actual physical elements may define a physical topology of the system being modeled. In an embodiment, physical connection lines do not represent time-varying signals or dataflow among graphical objects. Physical connection lines neither represent data input/output among graphical objects, nor suggest or have a particular direction, and thus may not be graphically represented as arrows.

As a result of the user inputs, the model editor 204 may build a model that may be displayed to the user on the display 120. The model may represent, at least in part, a physical system. The model may be a Simscape model, a Simulink model, a Stateflow chart, a MapleSim model, a LabVIEW block diagram, a VEE diagram, a MatrixX model, or a combination of the foregoing.

The graphical model may be executed, which may also be referred to as solving the model, as indicated at block 308. To solve a model, the simulation engine 206 may perform a plurality of steps, for example the simulation engine 206 may validate the model, construct a physical network based on the structure of the model, construct a system of equations for the model, compute initial conditions, perform a transient initialization to produce a set of initial conditions, and perform a transient solve of the system of equations. The transient initialization and transient solve steps may be repeated. A suitable model execution process for physical modeling is described in *Simscape User's Guide R*2011*b* (September 2011 ed.) from The MathWorks, Inc., which is hereby incorporated by reference in its entirety. The simulation engine 206 may be configured to solve the graphical model by generating a state space model that represents the system being modeled as a set of input, output and state variables related by first order differential equations. In addition, the simulation may utilize one or more of the solvers 222. As part of the simulation of the model, energy flows may be computed for at least some of the connection lines added to the model.

Model execution may be initiated through user input or programmatically. For example, the editor window may also include a plurality of command buttons, including a Run button, that may be selected by the user to execute the model. The UI engine 202 may also provide or support a Command Line Interface (CLI) that may receive a text-based run command entered by the user. In response to the user selecting the Run button or entering the run command, the simulation engine 206 may execute or simulate the graphical model, and may output results produced by the model's execution, for example, to the user via the display 120.

The UI engine 202 may also provide or support a Code Generation button in the GUI that may be selected by the user, or the UI engine 202 may receive a code generation command entered by the user, e.g., in the GUI or the CLI. The code generation command also may be invoked programmatically, for example, when a particular event occurs, such as a model passing verification, etc. In response to the code generation command being activated, the code generator 224 may generate code for the model, and may store the generated code in memory. In an embodiment, the generated code may be textual code, such as textual source code, that may be compiled and executed on a target machine or device. The generated code may conform to one or more programming languages, such as C, C++, C#, SystemC, VHDL, Verilog, embedded MATLAB, a vendor or target specific HDL code, such as Xilinx FPGA libraries, etc. The generated code may be compiled and executed by the target language compiler 226.

The connector tool 214 of the model editor 204 may receive an indication to toggle at least some of the individual physical connection lines presented in the graphical model from a multi-line display mode to a single line display mode, as indicated at block 310. The input may be received from a user or may occur programmatically.

In response to receiving the input, model editor 204 may determine which individual physical connection lines presented in the graphical model are subject to being aggregated, as indicated at block 312. A data structure may be created for a model that lists the graphical objects and connections included in the model. In an embodiment, at least some of the graphical objects provided by the physical modeling toolbox 208 may include configuration information that designates a plurality of its connection ports as being related to each other. For example, a graphical object may be pre-configured with a designation that a particular group of its connection ports are related to each other, and may be combined into a group. The model editor 204 may access and examine this configuration information for the graphical objects included in the model. The model editor 204 may thus determine which individual physical connections of the model may be aggregated. The graphical objects may be constructed through object oriented programming techniques, and the objects may support one or more methods or calls, such as a Get call that returns values of requested object properties.

The switching unit 216 may switch at least some of the identified physical connections from a multi-line display mode to a single line display mode by replacing the related individual connection lines with a single composite connection line, as indicated at block 314 (FIG. 3B). In the multi-line mode, a plurality of individual physical connection lines are shown in the model. In the single-line display mode, one or more groups of individual physical connection lines are replaced with a single, composite connection line. The single, composite connection line may have a different visual appearance than the individual connection lines. For example, the composite connection may be a different color, have a different style, such as a dashed rather than solid line, be bolded, or any combination thereof.

The user input for switching between the multi-line and single line modes may be provided graphically, for example through the selection of one or more command buttons, e.g., with the mouse 118, textually, or a combination of graphically and textually.

In addition to replacing one or more groups of individual physical connection lines with respective composite connection lines, the model editor 204 may also redraw one or more of the graphical objects replacing the plurality of individual connection ports or terminals with a single composite connection port or terminal to which the composite connection symbol is attached, as indicated at block 316.

After toggling from the multi-line mode to the single line mode, the model may again be executed, as indicated at block 318. In an embodiment, the single and multi line display modes for the model have no effect on the execution of the model. That is, the execution of the graphical model is the same whether the physical connection lines are represented as individual connection lines or as composite connections lines.

The switching unit 216 may also switch the graphical model from the single line mode to the multi-line mode. Specifically, the connector tool 214 of the model editor 204 may receive user or programmatic input to switch one or more composite physical connector lines presented in the model to a plurality of individual physical connection lines, as indicated at block 320.

In response, the model editor 204 may identify one or more composite connection lines in the model, and determine which composite connection lines are represented by the respective pluralities of individual connection lines, as indicated at block 322. The model editor 204 may make this determination by examining configuration information associated with the graphical objects of the model.

The switching unit 216 may replace one or more of the identified composite connection lines with a plurality of related individual connection lines, as indicated at block 324 (FIG. 3C). In addition to replacing one or more composite connection lines with a plurality of individual connection lines, the model editor 204 may also redraw the graphical objects replacing a single composite connection port with a plurality of individual connection ports to which the individual connection lines may be attached, as indicated at block 326.

In an embodiment, the switching unit 216 may be configured to operate at a plurality of different levels, such as a model level, a subsystem level, a connection level, and a port level. The switching unit 216 may be configured to constrain the toggling between the multi-line and single line modes to occur within a particular level of the model, as indicated at block 328. When the switching unit 216 operates at the model level, all related individual connections in the model are displayed in either the single-line display mode or the multi-line display mode. When the switching unit 216 operates in the subsystem level, then it may control the display of connection symbols on a subsystem by subsystem basis. For example, the connections lines of a first subsystem of the model may be presented in the multi-line mode, while the connection lines of a second subsystem of the model may be presented in the single line mode. When the switching unit 216 operates at the connection level, a first connection in the model may be represented by a composite connection symbol, while a second connection in the model may be represented by multiple individual connection symbols. When the switching unit operates at the port level, one end of a connection may be represented by a composite connection symbol while another end of the same connection may be represented by multiple individual connection symbols. In an embodiment, the user may set the level at which the switching unit 216 operates, for example in an options pane.

Those skilled in the art will understand that the operating level of the switching unit 216 may be set in other ways. For example, the user may select a particular connection in the model, and call up a properties pane for that connection, e.g., by right-clicking the connection with the mouse. The properties pane may include a setting for the operating level to be applied to that particular connection. In addition, a user may call up a properties pane for a block of the model. The properties pane may include a setting that controls whether the block includes a single composite port for connection to a composite connection symbol, or a plurality of individual ports for connection to respective ones of individual connection symbols.

One or more toolboxes of the modeling environment 200, such as the physical modeling toolbox 208 may include an interface object type, and one or more interface objects may be added to a model, as indicated at block 330. An interface object, which may appear as a block when added to the model, may be placed on an existing connection to convert the connection between a single composite connection symbol and a plurality of individual connection symbols at the interface block. For example, the interface block within a model may have a first interface that interfaces to the single composite connection symbol, and a second interface that interfaces to a plurality of individual connection symbols. The interface block may thus represent a transition point between a composite connection symbol and a plurality of individual connection symbols. The model editor 204 may convert the individual connection symbols to the single composite connection symbol at the interface block, as indicated at block 332.

Single Domain Modeling

Figure 4:
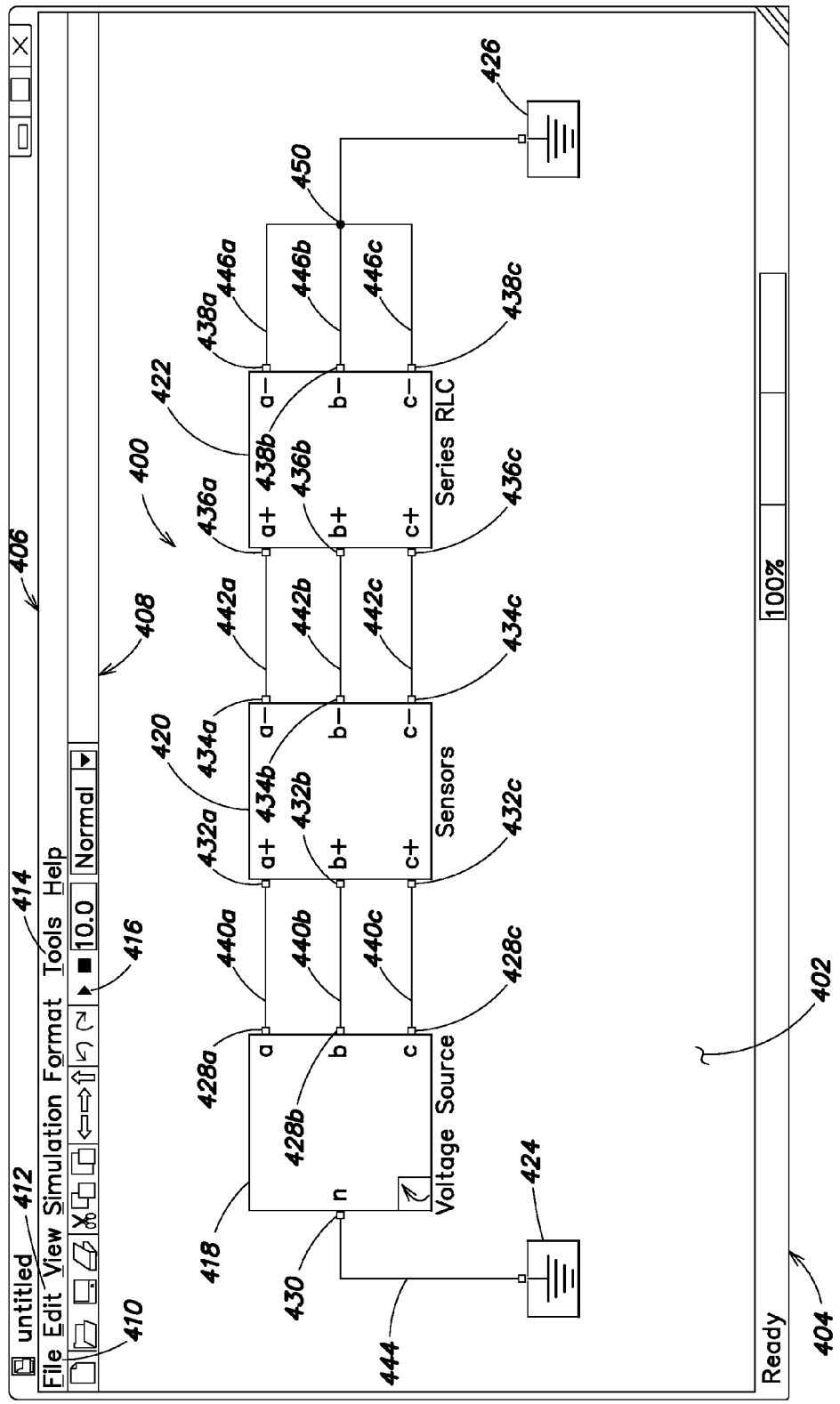
FIG. 4 is an illustration of an exemplary graphical model presented in multi-line mode in accordance with an embodiment of the present invention.

FIG. 4 is a schematic illustration of a computer generated, graphical model 400 of an electrical circuit. The model 400 may be constructed on a model canvas 402 of a model editor window 404. In addition to the canvas 402, the model editor window 404 may include a menu bar 406, and a toolbar 408. The model editor window 404 may also include other Graphical User Interface (GUI) elements, such as a status bar, etc. The menu bar 406 may include a File menu 410, an Edit menu 412, and a Tools menu 414, among others, and the toolbar 408 may include a Run button 416, among other command buttons. In response to a user selecting the Run button 416, for example with the mouse 118, the simulation engine 206 may simulate, e.g., solve, the model 400.

The model 400 may be created by a user interacting with the modeling environment 200. The user may construct the model 400 by selecting one or more graphical objects from one or more libraries, and adding them to the model 400, for example through drag and drop operations, among others. The library may provide a plurality of graphical object types representing electrical components, such as transformers, lines, machines, power electronics, etc.

The model 400 includes a three-phase voltage source block 418, a three-phase Voltage/Current measurement (sensors) block 420, and a three-phase series Resistor-Inductor-Capacitor (RLC) load block 422. The model 400 further includes first and second ground blocks 424, 426

The voltage source block 418 may be configured to generate a three-phase sinusoidal voltage. It may also provide time-varying parameters. The time variation for the amplitude, phase, or frequency of the fundamental component of the voltage source may be programmed by the user by setting one or more block parameters. In an embodiment, two harmonics of the voltage source may be programmed and superimposed on the fundamental signal. The sensors block 420 may be configured to measure instantaneous three-phase voltages, currents or both in the circuit model. When connected in series with three-phase elements, the sensors block 420 may measure the three phase-to-ground or phase-to-phase peak voltages and currents as configured, for example by the user. The RLC load block 422 implements a three-phase balanced load as a series combination of resistor, inductor, and capacitor elements. At a specified frequency, the load may exhibit a constant impedance. The active and reactive powers absorbed by the load is proportional to the square of the current flowing through the load.

The voltage source block 418 includes three individual physical connection ports (also referred to as terminals) 428a-c, one for each electrical phase of the voltage source, and a ground connection port 430. The sensors block 420 has first set of individual physical connection ports 432a-c, one for each electrical phase, and a second set of individual physical connection ports 434a-c, one for each electrical phase. The load block 422 has a first set of individual physical connection ports 436a-c, one for each phase, and a second set of individual physical connection ports 438a-c, one for each phase.

In an embodiment, the physical connection ports may be used with physical connection lines to mimic the actual physical connections between elements represented by the respective model components. Each individual physical connection port may represent an energy flow of the respective component.

The connection ports 428a-c of the voltage source block 418 may be connected to the first set of connection ports 432a-c of the sensors block 420 by individual physical connection lines 440a-c. Similarly, the second set of connection ports 434a-c of the sensors block 420 may be connected to respective connection ports 436a-c of the load block 422 by individual connection lines 442a-c. The ground connection port 430 of the voltage source block 418 may be connected to the first ground block 424 by a connection line 444, and connection ports 438a-c of the load block 422 may be connected to the second ground block 426 by individual physical connection lines 446a-c. In particular, the three individual physical connection lines 446a-c may connect to a join point 450 that is also connected to the second ground block 426. The join point 450 may represent a multi-phase wye or star connection.

In an embodiment, the modeling environment 200 may be set, by default, to present physical connections of the model 400 in the multi-line mode, in which each individual physical connection line is displayed. Accordingly, when the user adds a block to the canvas that supports a plurality of individual connections designated as capable of being combined, such as the voltage source block 418, a separate physical connection port is displayed for each individual connection. Nonetheless, during or after construction of the model 400, the user may direct the modeling environment 200 to switch to the single line mode, for example to reduce visual clutter. In the single line mode, one or more groups of individual physical connection lines designated as capable of being combined are replaced with composite connection lines.

The user input for switching between the multi-line and single line modes may be received through graphical, textual, or a combination of graphical and textual inputs. For example, the UI engine 202 may provide one or more graphical icons for selection by the user.

Figure 5:
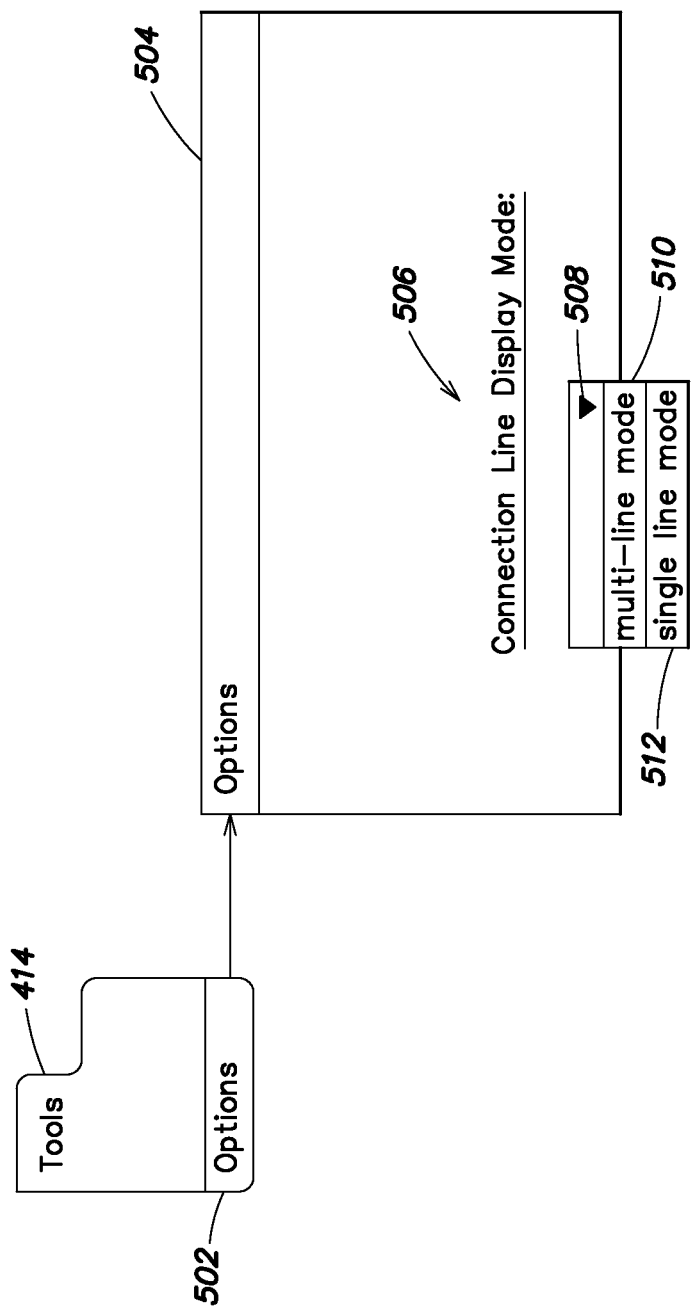
FIG. 5 is an illustration of a configuration pane in accordance with an embodiment of the present invention.

FIG. 5 is a schematic illustration of GUI elements for receiving user input to switch between the multi-line and single line modes. More specifically, selection of the Tools menu 414, e.g., using the mouse 118, may cause a plurality of sub-menus to be displayed, including an Options sub-menu 502. The UI engine 202, in response to selection of the Options sub-menu 502, e.g., by the user with the mouse 118, may present an Options pane 504. The Options pane 504 may itself include a plurality of graphical widgets for receiving user selections, such as check boxes, radio buttons, drop down menus, etc. Specifically, the Options pane 504 may be configured to include a particular graphical widget, such as a drop down list 506, labeled "Connection Line display mode". This drop down list 506 may include drop down arrow 508 that, when selected, presents two items: a "multi-line mode" entry 510, and a "single-line mode" entry 512, either of which may be selected by the user, e.g., with the mouse 118. As noted, by default, the connection line display mode for the model 400 may be set to the multi-line mode entry 510. The user may direct the switching unit 216 to toggle to the single line mode by choosing the single line mode entry 512 in the options pane 504. In response, the switching unit 216 may cause the model 400 to be redrawn in the model editor 404 window such that one or more groups of individual physical connection lines designated as being combinable are replaced with composite connection lines.

By selecting entry 510 or 512, the user may control whether the model 400 is presented in multi-line mode, in which individual physical connections are shown, or single line mode, in which multiple individual physical connection lines are aggregated into a composite physical connection.

Figure 6:
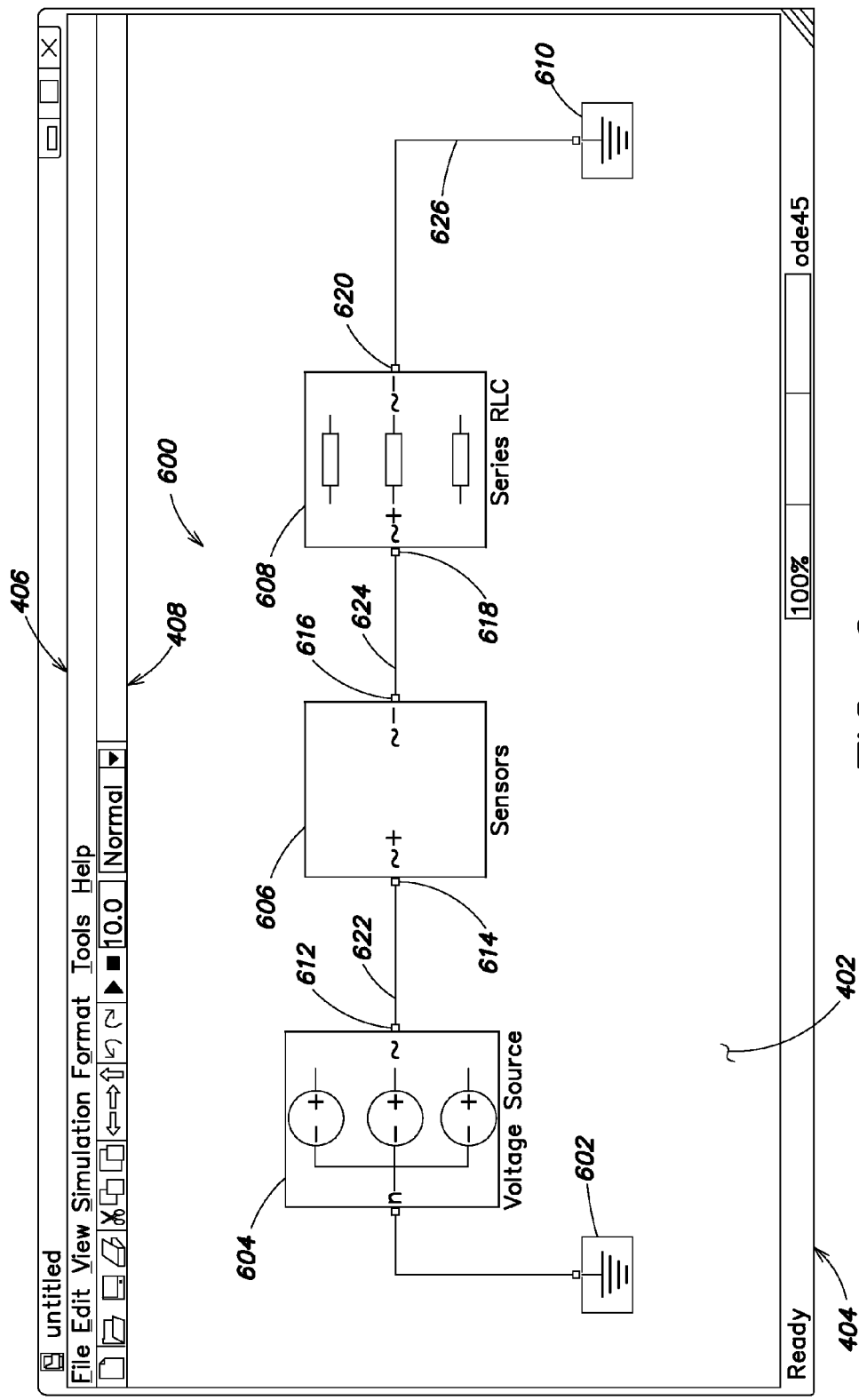
FIG. 6 is an illustration of the graphical model of FIG. 4 presented in single line mode in accordance with an embodiment of the present invention.

FIG. 6 is a schematic illustration of a graphical model 600, that corresponds to the graphical model 400 (FIG. 4), in the single line mode. Like the model 400, the graphical model 600 includes a first ground block 602, a three-phase voltage source block 604, a three-phase measurements (sensors) block 606, a three-phase load block 608, and a second ground block 610. In an embodiment, the second ground block 610 may be a composite ground block that includes both a join connection, such as a wye connection, in addition to the ground, to permit the second ground block 610 to connect to the multiple phases of the three-phase load block 608. Because it provides a single ground point, the first ground block 602 does not include a wye or other join connection. Because the model editor 204 has been switched to the single line mode, the model editor 204 replaces the three connection ports 428a-c (FIG. 4) of the voltage source block 418, which are configured as capable of being aggregated, with a single composite connection port 612 on the voltage source block 604. Furthermore, the model editor 204 replaces each of the first set of connection ports 432a-c and the second set of connection ports 434a-c of the sensors block 420, which are configured as capable of being aggregated, with a first composite connection port 614 and a second composite connection port 616, respectively, on the sensors block 606. The model editor 204 also replaces the first set of connection ports 436*a-c* and the second set of connection ports 438*a-c* of the load block 422, which are configured as aggregable, with a first composite connection port 618 and a second composite connection port 620, respectively, on the load block 608.

Similarly, the three individual physical connections 440*a-c* between the voltage source block 418 and the sensors block 420 are replaced with a single, composite physical connection 622 between the voltage source block 604 and the sensors block 606. The three individual physical connections 442*a-c* between the sensors block 420 and the load block 422 are replaced with a single, composite physical connection 624 between the sensors block 606 and the load block 608. Finally, the three individual physical connections 446*a-c* between the load block 422 and the second ground block 426 are replaced with a single, composite connection 626 between the load block 608 and the second ground block 610. As compared to model 400, the graphical model 600 has less visual clutter. Nonetheless, the components 604, 606, 608, 610 of the graphical model 600 are still three-phase components, and simulation of the graphical 600 operates in the same way as simulation of the graphical model 400. That is, the results produced during simulation of the model 600 are the same as the results produced during simulation of the model 400.

As shown, the model editor 204 may be configured to change the number of connection ports presented on one or more graphical objects in response to a change in the display mode.

Furthermore, the switching unit 216 may toggle all physical connections of the graphical model connected to ports that are configured as capable of being aggregated between the multi-line and single-line modes. As noted, the switching unit 216 may be configured to operate at multiple hierarchical levels, such as a model level, a subsystem level, a connection level, and a port level. The "multi-line mode" and "single-line mode" entries 510, 512 of the model options pane 504 may be used to toggle between individual and composite connections at the model level. In other words, the switching unit 216 may switch all physical connections of the model 400 designated as forming a group between the multi-line mode and the single line mode.

To the extent a model includes a subsystem block, the modeling environment 200 may provide a Connection Line Display Mode setting for the subsystem block. The setting may be accessed by a user selecting the subsystem in a predetermined manner, e.g., with a right mouse click, which may cause the UI engine 202 to present a properties or settings pane for the subsystem. The properties pane may include a Connection Line Display Mode drop down menu, which may be similar to the Connection Line Display Mode drop down menu 506 (FIG. 5) used for the model. If the setting is set to multi-line mode, the switching unit 216 may present all of the physical connections connected to ports designated as forming a group within the subsystem in multi-line mode. However, other connections within the model that are outside of the particular system may be presented in the single line mode. If the setting is set to single-line mode, the switching unit 216 may present all of the physical connections connected to ports designated as forming a group in single line mode, e.g., as single, composite physical connections. However, other physical connections that are outside of the particular subsystem may be presented in the multi-line mode.

The modeling environment 200 may also provide a separate Connection Line Display Mode setting option for the graphical objects, connection ports, and connections of a model, and these options may be toggled by a user between a multi-line mode and a single line mode. The switching unit 216 may respond by causing the respective graphical object, connection port or connection to be presented in the multi-line mode or the single line mode. Accordingly, the user may control the granularity, for example model, subsystem, block, port or terminal, and connection, at which the multi-line and single line modes are presented within a model.

In addition to specifying single line or multi-line modes through a graphical element, a user may toggle between the single line and multi-line modes through one or more textual commands entered in a command line interface.

Interface Blocks

One or more of the libraries provided by the physical modeling toolbox 208, such as library 230, may include one or more interface graphical object types, and instances of this interface object may be added to a graphical model. For example, the library 230 may include a splitter interface object type. The splitter interface object type may be selected by a user, and a respective instance may be added to a graphical model, for example through drag and drop operations.

Figure 7:
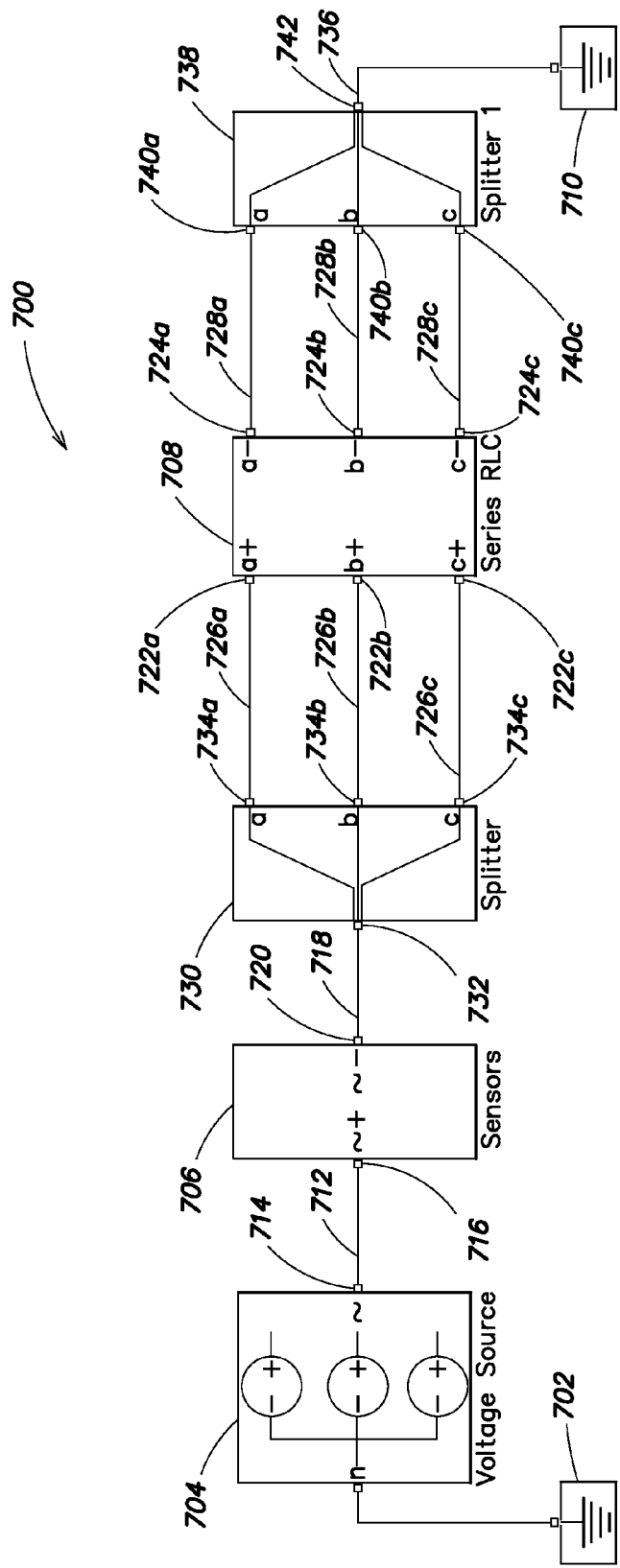
FIG. 7 is an illustration of a graphical model in accordance with an embodiment of the present invention.

FIG. 7 is a schematic illustration of a graphical model 700 that includes two interface objects. The model 700 includes a first ground block 702, a three-phase voltage source block 704, a three-phase Voltage/Current measurement (sensors) block 706, a three-phase series RLC load block 708, and a second ground block 710 having an internal wye connection. The voltage source block 704 and the sensors block 706 are represented in the single line mode. In particular, a first composite connection 712 connects a single connection port 714 of the voltage sensors block 704 to a single connection port 716 of the sensors block 706. A second composite connection 718 connects to a single connection port 720 of the sensors block 706. The load block 708, on the other hand, is represented in multi-line mode. In particular, the load block 708 has a first set of three individual connection ports 722*a-c* and a second set of three individual connection ports 724*a-c*. Three individual physical connections 726*a-c* are connected to the first set of connection ports 722*a-c*, and three individual physical connections 728*a-c* are connected to the second set of connection ports 724*a-c*.

To transition from the second composite connection 718 connected to the composite connection port 720 of the sensors block 706 to the three individual connections 726*a-c* connected to the first set of connection ports 722*a-c* of the load block 708, the model 700 further includes a first splitter interface block 730. The splitter interface block 730 has one composite connection port 732 that is connected to the second composite connection 718, and three individual connection ports 734*a-c* that are connected to the individual physical connections 726*a-c* leading to the load block 708. To transition from the three individual connections 728*a-c* connected to the second set of connection ports 724*a-c* of the load block 708 to a composite connection 736 leading to the second ground block 710, the model 700 includes a second splitter interface block 738. The second splitter interface block 738 has three individual port connections 740*a-c* that are connected to the individual connections 728*a-c*, and one composite connection port 742 that is connected to the third composite connection 736 leading to the ground block 710.

In an embodiment, the interface objects, such as the splitter interface block, are polymorphic. That is, the interface blocks can transition between any number of individual physical connections and a composite physical connection. When added to a graphical model, the model editor 204 may evaluate the neighboring blocks to determine the number of individual connection ports that are present, and automatically provide a respective number of individual connection ports on the interface block for connection to those individual connections in the model. Furthermore, the interface blocks may be virtual blocks. That is, there may not be any executable operations or functions associated with the interface blocks.

In an embodiment, in response to the user switching the load block 708 from the multi-line mode to the single line mode, the model editor 204 may redraw the model automatically eliminating the interface blocks 730, 738 from the model, and connecting the composite lines 718, 736 directly to the load block 708.

Multi-Doman Modeling

Graphical models may also be constructed from graphical objects that are associated with different modeling domains. Exemplary modeling domains include a physical modeling domain, a time-based modeling domain, a state-based modeling domain, and a dataflow modeling domain, among others. As noted, the physical modeling domain may support a plurality of sub-domains.

Figure 8A:
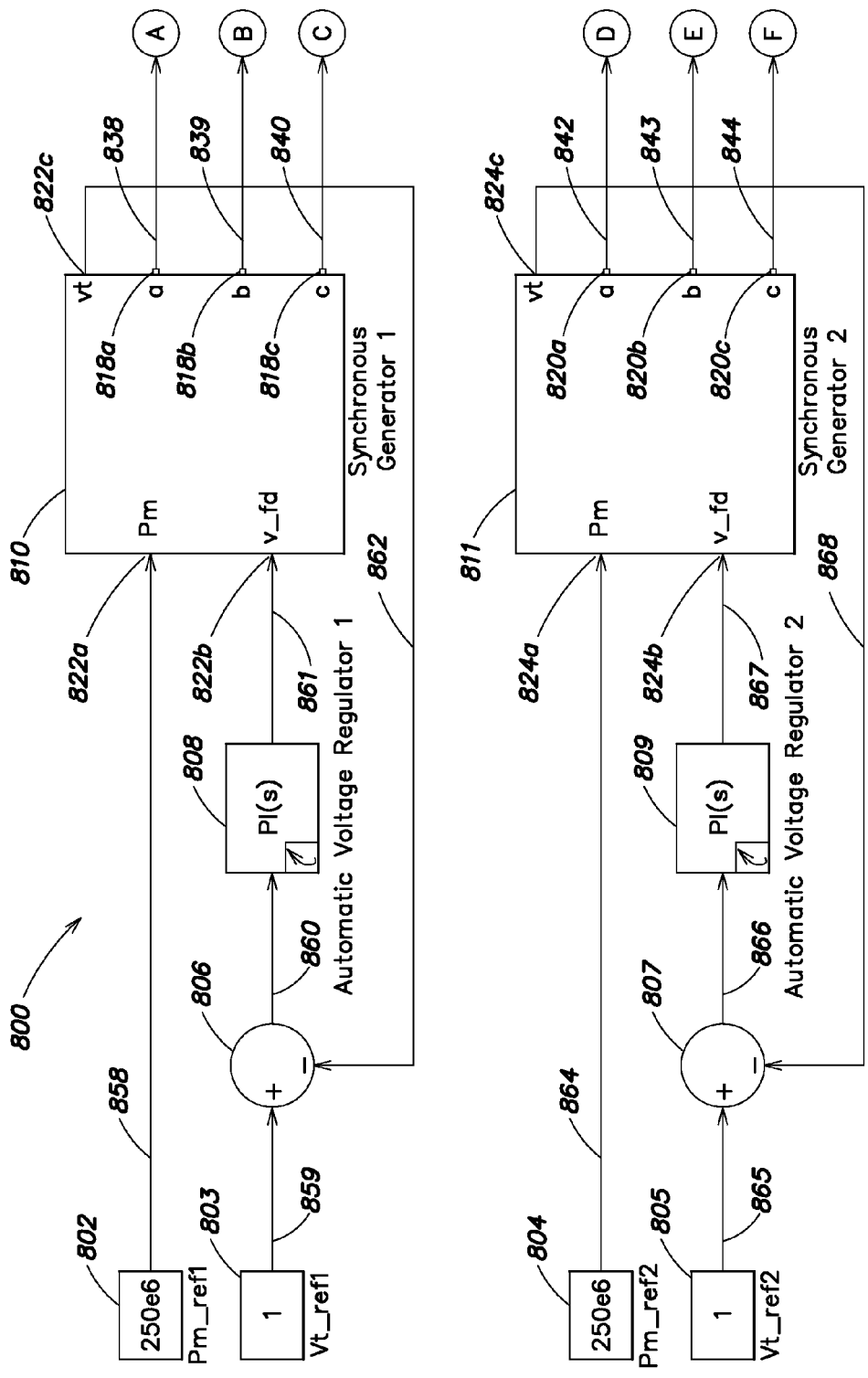
FIGS. 8A and B are an illustration of a graphical model presented in multi-line mode in accordance with an embodiment of the present invention.
Figure 8B:
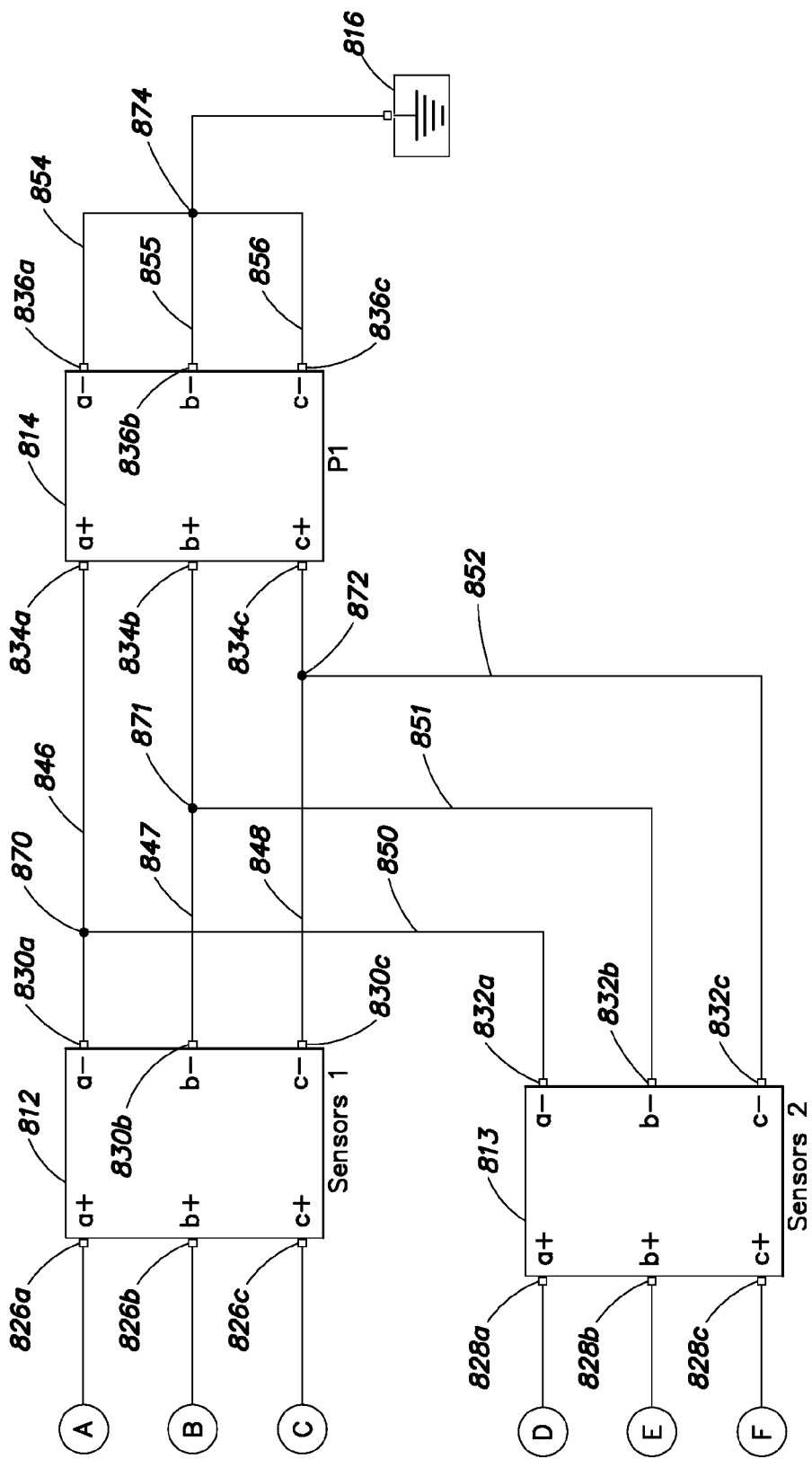

FIGS. 8A and B are a schematic illustration of a multi-domain graphical model 800. The model 800 includes some graphical objects configured to operate according to a physical modeling domain and other graphical objects configured to operate according to a time-based modeling domain. Specifically, the model 800 includes four data inport blocks 802-805, two Add blocks 806, 807, two automatic voltage regulator subsystem blocks 808, 809, two synchronous generator subsystem blocks 810, 811, two three-phase Voltage/Current measurement (sensors) blocks 812, 813, a three-phase electrical load subsystem block 814, and a ground block 816. The inport blocks 802-805, Add blocks 806, 807, and voltage regulator subsystem blocks 808, 809 operate according to the time-based modeling domain. The sensors blocks 812, 813, the three-phase electrical load subsystem block 814, and the ground block 816 operate according to the physical modeling domain. The synchronous generator subsystem blocks 810, 811 include blocks (not shown) operating according to both the physical modeling domain and the time-based modeling domain. Additionally, each synchronous generator subsystem block 810, 812 has three physical connection ports 818*a*-*c*, 820*a*-*c*, respectively. The three physical connections ports 818*a*-*c*, 820*a*-*c* represent electrical phases. Each synchronous generator subsystem block 810, 811 also includes three signal ports 822*a*-*c*, 824*a*-*c*. The first signal ports 822*a*, 824*a* are configured to receive a time-varying input signal representing a supply of mechanical power (Pm), for example in watts. The second signal ports 822*b*, 824*b* are configured to receive a time-varying input signal representing the amplitude of the internal voltage of the generator (v_fd). The third signal ports 822*c*, 824*c* are configured to produce a time-varying output signal representing a terminal voltage (vt).

The sensors blocks 812, 813 each include a first set of physical connection ports 826*a*-*c*, 828*a*-*c*, and a second set of physical connection ports 830*a*-*c*, 832*a*-*c*. The three-phase electrical load subsystem block 814 also includes a first set of physical connection ports 834*a*-*c*, and a second set of physical connection ports 836*a*-*c*. The physical connection ports 818*a*-*c*, 820*a*-*c* of the synchronous generator subsystem blocks 810, 811 are connected to the first set of physical connections ports 826*a*-*c*, 828*a*-*c* of the sensors blocks 812, 813 by respective individual physical connections 838-840, 842-844. The second set of physical connection ports 830*a*-*c*, 832*a*-*c* of the sensors blocks 812, 813 are connected to the first set of physical connection ports 834*a*-*c* of the three-phase electrical load subsystem block 814 by respective individual connection lines 846-848 and 850-852 that are connected by respective T-junctions 870-872. A T-junction may represent a branch between two lines. The second set of connection ports 836*a*-*c* of the three-phase electrical load subsystem block 814 are connected to the ground block 816 by individual connection lines 854-856 via a join point 874, such as a wye connection.

The model 800 is shown in the multi-line mode. That is, the model 800 includes individual physical connection lines 838-840, 842-844, 846-848, 850-852, and 854-856, which correspond to the different electrical phases of a three-phase electrical system. In addition to the individual physical connection lines, the model also includes signal lines. Specifically, the model 800 includes a first signal line 858 from the first inport block 802 to the first synchronous generator subsystem block 810, a second signal line 859 from the second inport block 803 to the first Add block 806, a third signal line 860 from the first Add block 806 to the first automatic voltage regular subsystem block 808, a fourth signal line 861 from the first automatic voltage regular subsystem block 808 to the first synchronous generator subsystem block 810, and a fifth signal line 862 from the first synchronous generator subsystem block 810 to the first Add block 806. The fifth signal line 862 represents a feedback path of the first synchronous generator subsystem block 810 of the model 800.

The model 800 further includes a sixth signal line 864 from the second inport block 804 to the second synchronous generator subsystem block 811, a seventh signal line 865 from the fourth inport block 805 to the second Add block 807, an eighth line 866 from the second Add block 807 to the second automatic voltage regular subsystem block 809, a ninth signal line 867 from the second automatic voltage regular subsystem block 809 to the second synchronous generator subsystem block 811, and a tenth signal line 868 from the second synchronous generator subsystem block 811 to the second Add block 807, which represents a feedback loop of the second synchronous generator subsystem block 811 of the model 800.

In an embodiment, a signal refers to a time-varying quantity that has values at all points in time, for example between a simulation start time and a simulation end time. A signal is an output of a dynamic system represented by a graphical object, for example a block, of the time-based modeling domain. Signal lines of a graphical model may represent mathematical relationships among signals defined in the model. As illustrated in FIGS. 8A and B, signal lines are lines with arrowheads that identify the source and sink of the signal line. The source of a signal line, as indicated by the arrow's tail, corresponds to the block that writes to the signal during evaluation of the block's methods, e.g., its equations. The destination of a signal line, as indicated by the arrow's head, are the one or more blocks that read the signal during the evaluation of their methods, e.g., equations. In an embodiment, physical connection lines do not carry signals.

In response to user (or programmatic) input switching from the multi-line mode to the single line mode, the switching unit may redraw the model 800 so that at least some of the individual physical connection lines are replaced with composite connections lines.

Figure 9A:
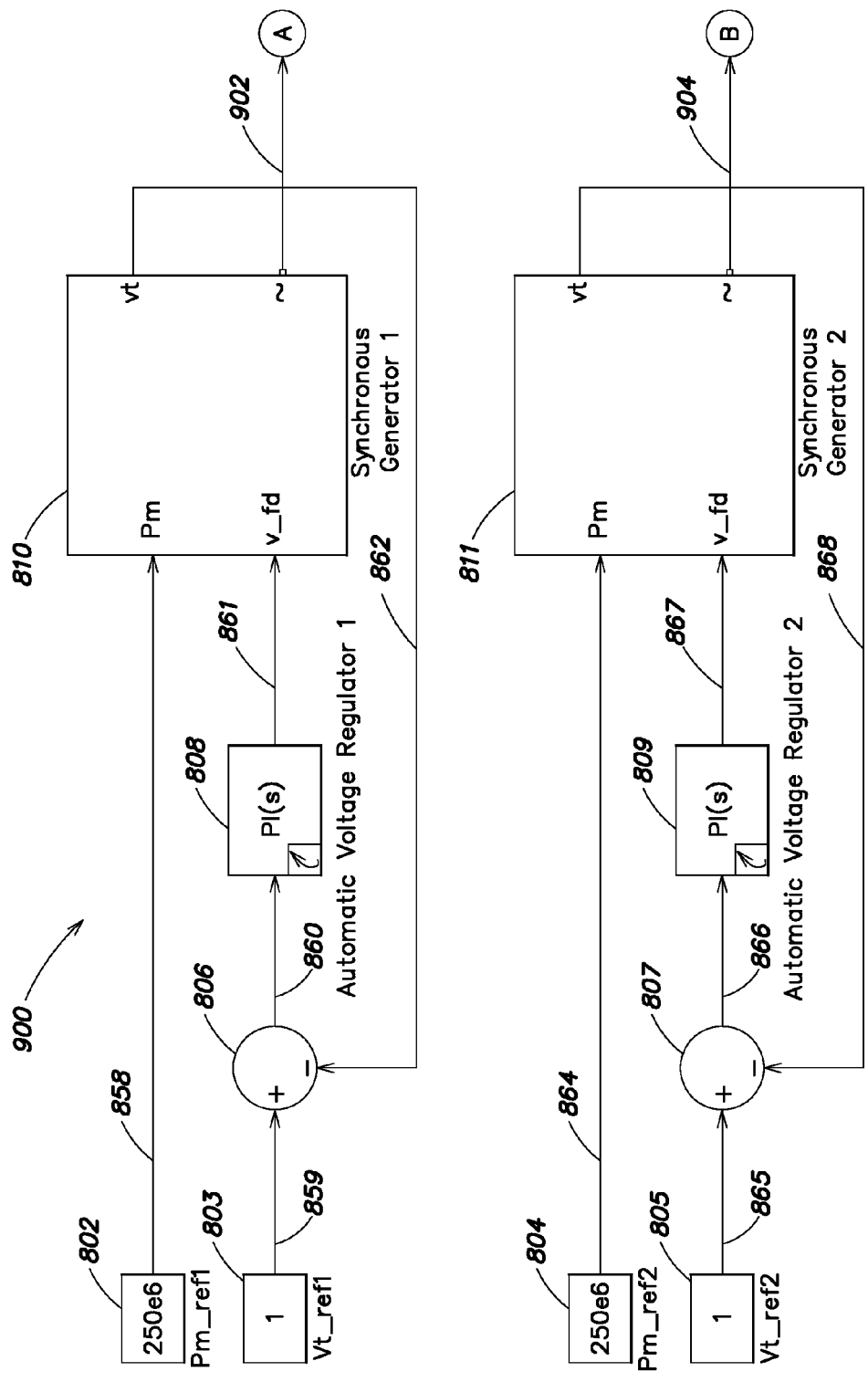
FIGS. 9A and B are an illustration of the graphical model of FIG. 8 presented in single line mode in accordance with an embodiment of the present invention.
Figure 9B:
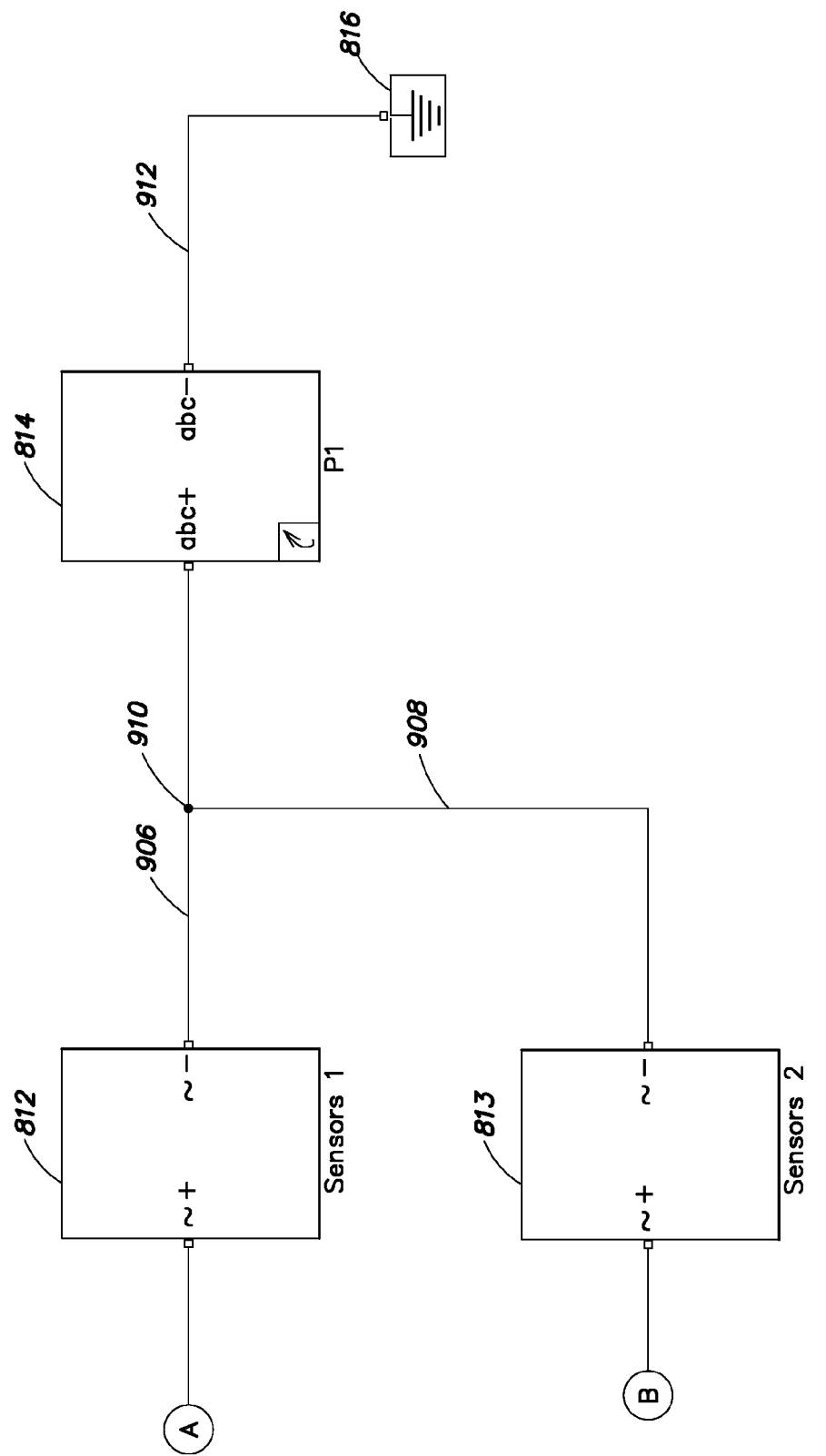

FIGS. 9A and B are a schematic illustration of a graphical model 900 that is similar to model 800 (FIGS. 8A and B), but is presented in the single line mode. Specifically, the three individual physical connection lines 838-840 (FIG. 8A) are replaced with a first composite connection line 902. The three individual connection lines 842-844 (FIG. 8A) are replaced with a second composite connection line 904. The individual connections lines 846-848 and 850-852 are replaced with third and fourth composite connections lines 906, 908. The fourth composite connection line 908 is coupled to the third connection line 906 at a join point 910, e.g., a T-junction. The individual connection lines 854-856 are replaced with a fifth composite connection line 912. In addition, multiple individual connection ports are also replaced with composite connection ports.

While the transition from the multi-line mode (FIGS. 8A and B) to the single line mode (FIGS. 9A and B) replaces individual physical connection lines with composite connection lines, the signal lines of the graphical model 900 remain unchanged as compared to model 800.

Individual physical connection lines and/or a composite connection line may be nested within other connection symbols of a graphical model. For example, a model may include a hybrid connection symbol between two or more subsystems. Nested within the hybrid connection symbol may be one or more composite connection lines, each associated with a plurality of individual connection lines, and a signal arrow representing a time-varying quantity.

In response to user selection of a hybrid connection symbol, for example double-clicking the hybrid connection system, the model editor 204 may redraw the graphical model replacing the hybrid connection symbol with separate connection symbols representing each of the connections that are nested within hybrid connection symbol. In addition, a composite connection line may be nested within one or more other composite connection lines.

Figure 10:
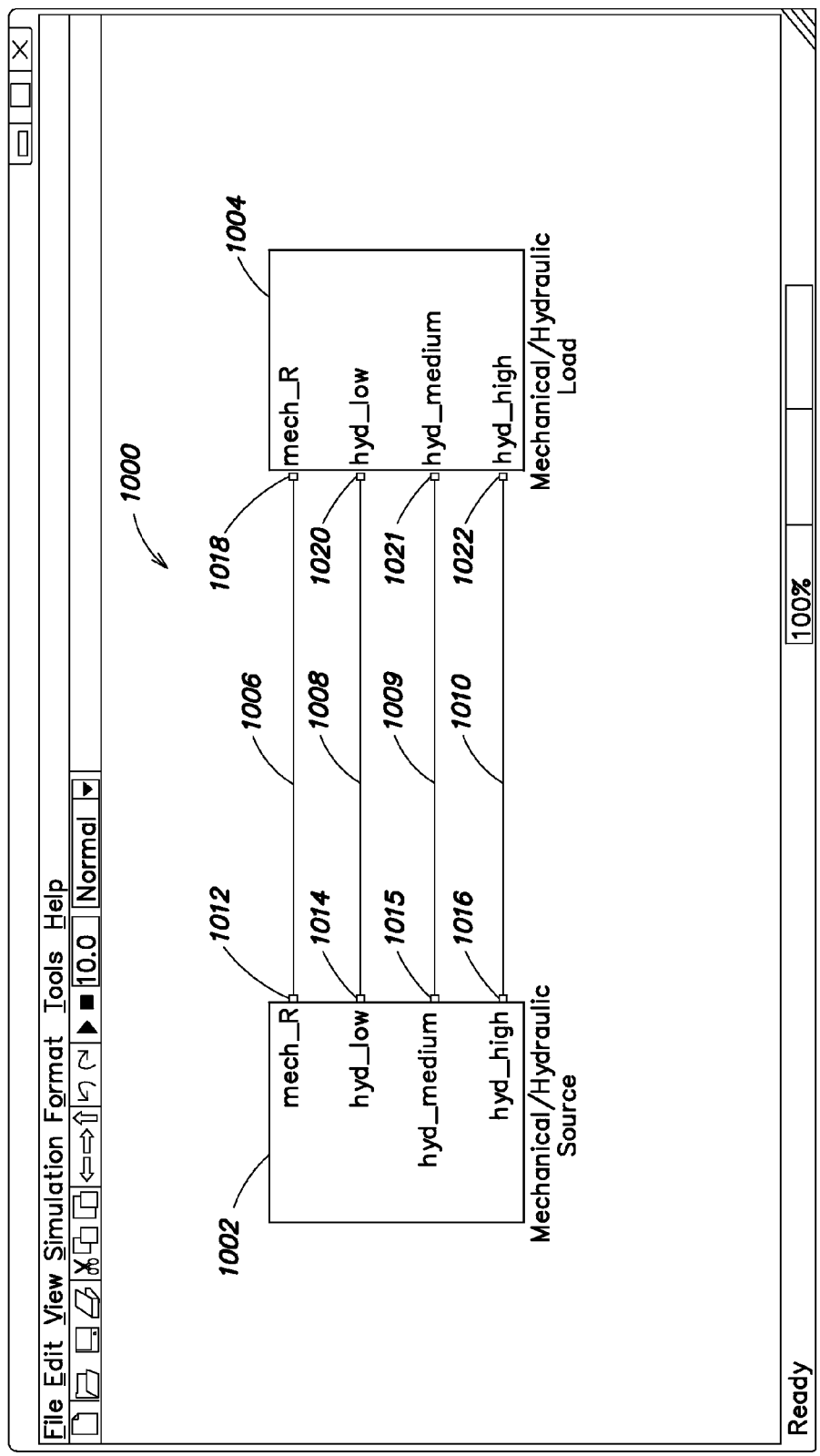
FIG. 10 is an illustration of a graphical model presented in a multi-line mode in accordance with an embodiment of the present invention.

FIG. 10 is a schematic illustration of a graphical model 1000. The model 1000 includes a mechanical/hydraulic source block 1002 and a mechanical/hydraulic load block 1004. Blocks 1002, 1004 may be subsystem blocks and may contain blocks operating according to a mechanical physical modeling sub-domain as well as blocks operating according to a hydraulic physical modeling sub-domain. The blocks 1002, 1004 may be connected by a plurality of physical connections. In particular, the blocks 1002, 1004 may be connected by an individual mechanical connection line 1006 that may represent a mechanical connection, such as a rotating mechanical shaft, and three individual hydraulic connection lines 1008-1010 that represent hydraulic connections, e.g., low, medium and high pressure hydraulic lines. The source block 1002 may include a physical connection port 1012, and three individual hydraulic connection ports 1014-1016. The load block 1004 may include a physical connection port 1018, and three individual hydraulic connection ports 1020-1022. Model 1000 is presented in the multi-line model.

Figure 11:
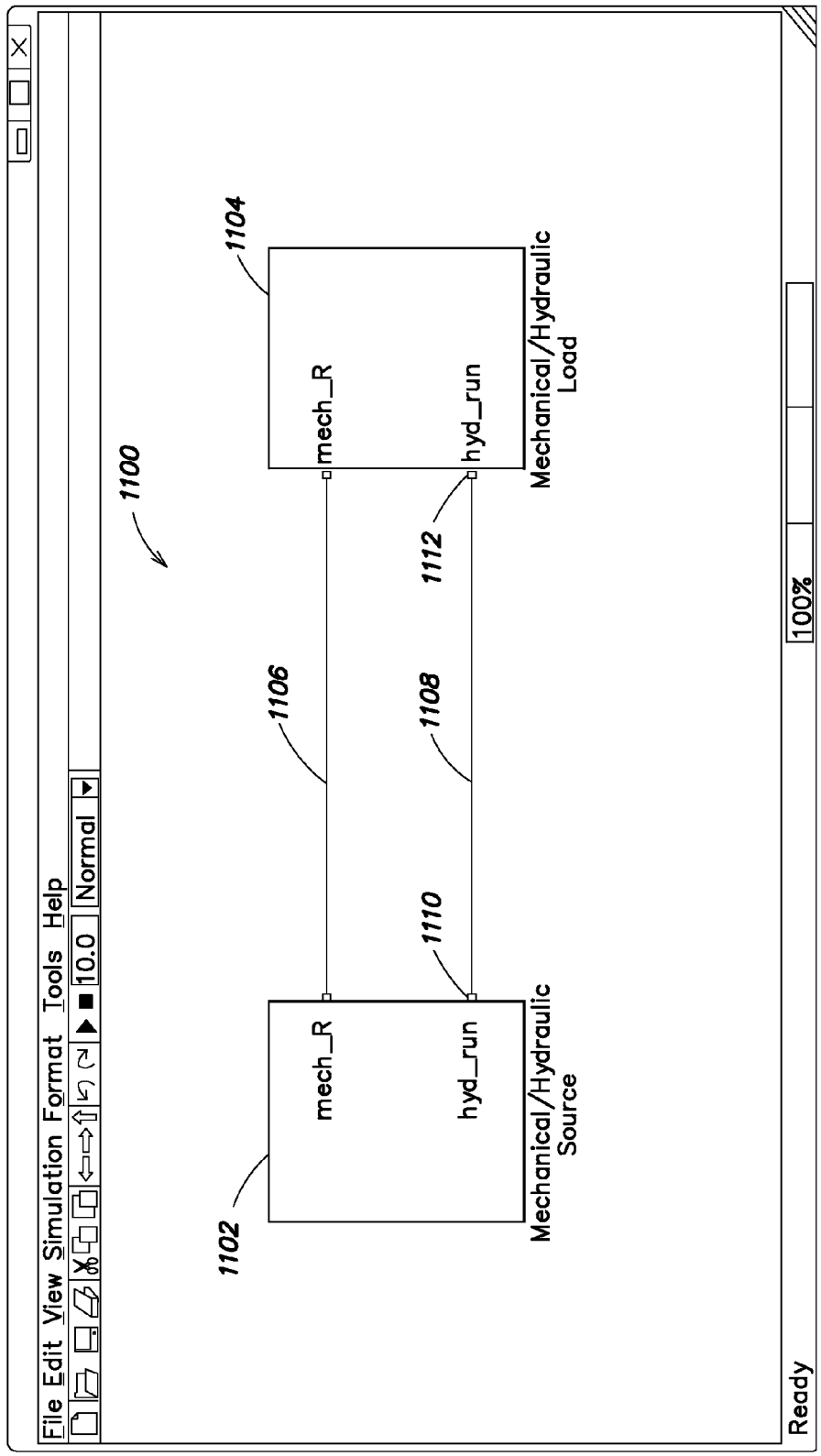
FIG. 11 is an illustration of the graphical model of FIG. 10 presented in a first single line mode in accordance with an embodiment of the present invention.

FIG. 11 is a schematic illustration of a graphical model 1100 that is similar to model 1000 (FIG. 10), but is presented in a first single line mode. The model 1100 includes a mechanical/hydraulic source block 1102 and a mechanical/hydraulic load block 1104 that contain blocks operating according to a mechanical physical modeling domain and to a hydraulic modeling domain. While a single mechanical physical connection line 1106 also connects the source block 1102 and the load block 1104, the three individual hydraulic physical connections 1008-1010 (FIG. 10) are replaced with a composite hydraulic connection line 1108. Similarly, the three individual hydraulic connection ports 1014-16 (FIG. 10) are replaced with a single composite connection port 1110 on the source block 1102. Similarly, the three individual hydraulic connection ports 1020-1022 (FIG. 10) are replaced with a single composite connection port 1112 on the load block 1104.

Figure 12:
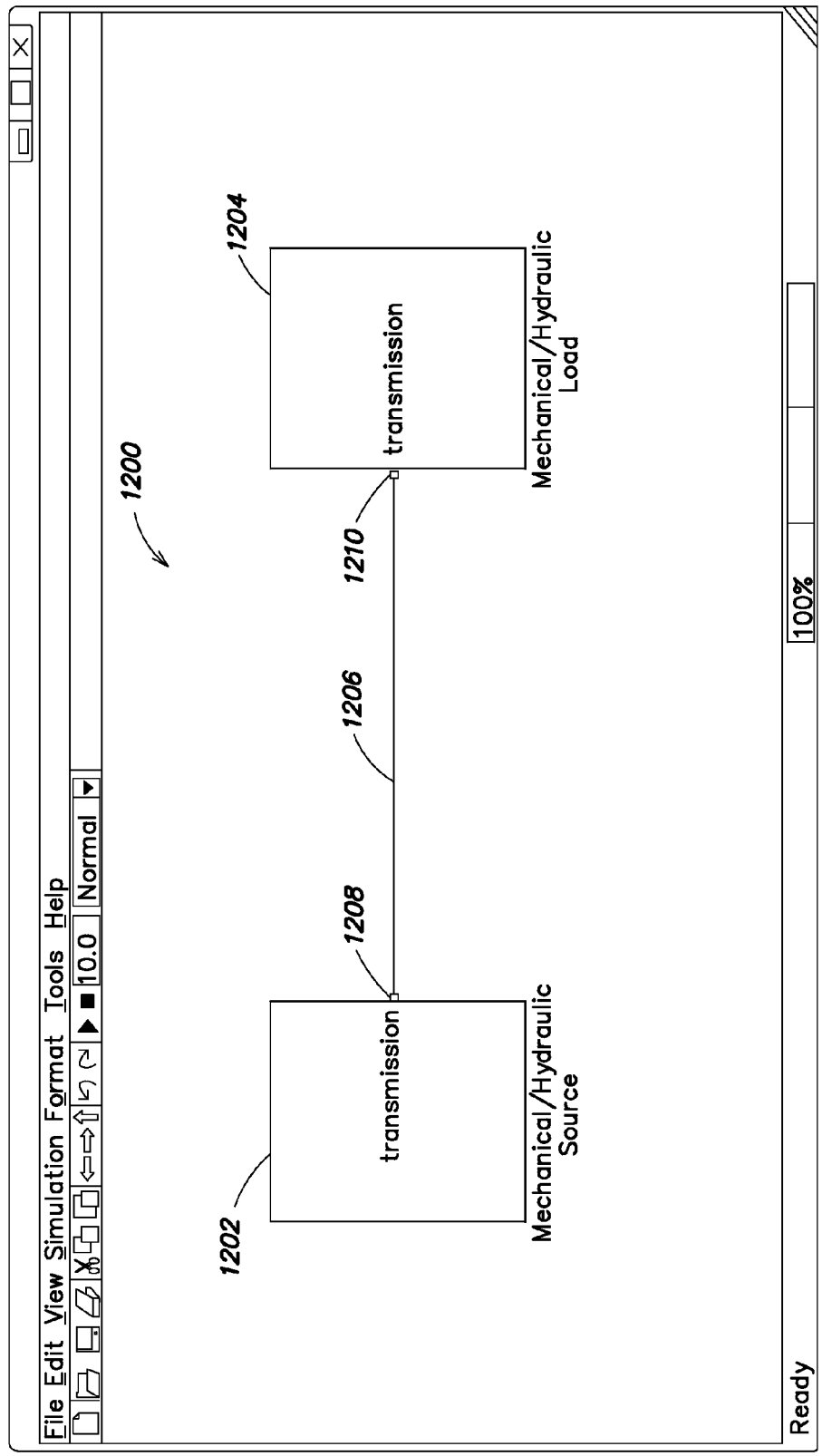
FIG. 12 is an illustration of the graphical model of FIG. 10 presented in a second single line mode in accordance with an embodiment of the present invention.

FIG. 12 is a schematic illustration of a graphical model 1200 that is similar to model 1000 (FIG. 10), but is presented in a second single line model. The model 1200 includes a mechanical/hydraulic source block 1202 and a mechanical/hydraulic load block 1204 that contain blocks operating according to a mechanical physical modeling domain and to a hydraulic modeling domain. In this embodiment, the individual mechanical physical connection line 1006 (FIG. 10) and the three individual hydraulic connection lines 1008-1010 (FIG. 10) are replaced with a single hybrid composite connection line 1206, also referred to as a transmission line, that represents both a mechanical connection and a hydraulic connection between the two blocks 1202, 1204. The source block 1202 includes a single hybrid connection port 1208, and the load block 1204 includes a single hybrid connection port 1210. As shown, the hybrid composite connection line 1206 may represent the individual mechanical connection line 1006 (FIG. 10) and the three individual hydraulic connection lines 1008-1010 (FIG. 10).

In a second embodiment, the hybrid composite connection line 1206 may represent the mechanical connection 1106 (FIG. 11) and the composite hydraulic connection line 1108 (FIG. 11), which in turn, represents the three individual hydraulic connection lines 1008-1010 (FIG. 10). That is, a hybrid composite connection line or even a composite connection line may represent a hierarchical nesting of other composite connection lines or a combination of composite connection lines and individual connection lines.

In an embodiment, the switching unit 216 may receive a selection, such as a user-selection, of a plurality of connections, such as connections 1106 and 1108 (FIG. 11) to be aggregated into a hybrid composite connection, such as hybrid composite connection 1206 (FIG. 12). For example, a user may select connections 1106 and 1108, and select an 'Aggregate' command, which may be a sub-command from the 'Tools' menu. In another embodiment, aggregation may be performed in response to a textual command, for example entered by a user at a CLI. The command to aggregate connections 1106 and 1108 may also occur programmatically.

One of the advantages of the present invention is the ability to simulate the occurrence of fault or error conditions in models of physical systems, especially on individual physical connection lines.

Figure 13A:
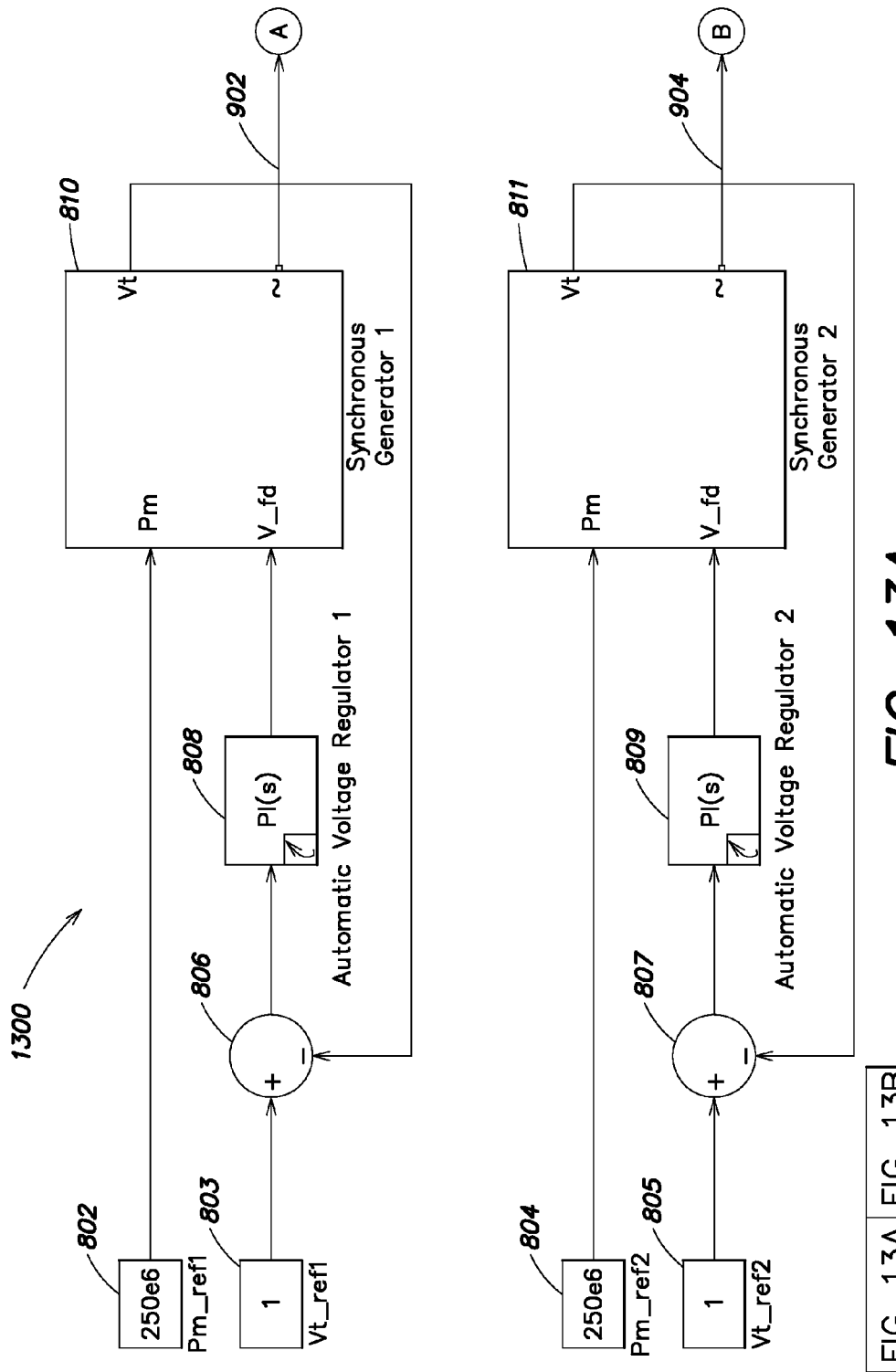
FIGS. 13A and B are an illustration of a graphical model having a simulated fault condition in accordance with an embodiment of the present invention.

FIGS. 13A and B are a schematic illustration of a graphical model 1300, which is similar to model 900 (FIGS. 9A and B). The model 1300 includes a splitter interface block 1302 connected to the fourth composite connection line 908, which provides a transition from the composite connection line 908 to the three individual connection lines 1304-1306 that make up the fourth composite connection line 908. The model 1300 also includes a fault block 1308 connected between the first and second individual connection lines 1304, 1305. The fault block 1308 represents a graphical object configured to introduce a fault condition. In particular, during simulation of the model 1300, the fault block 1308 introduces a fault between electrical phases a and b at the first sensors block 812, the second sensors block 813, and the three-phase electrical load subsystem block 814 (by virtue of the T-junction 910) of the model 1300. A fault block may cause a short circuit to occur between two blocks of a graphical model at a particular time during the simulation of the graphical model. The individual connection line 1306, which corresponds to electrical phase c, is connected to an open circuit termination block 1310.

As shown, during simulation of the model 1300, the fault block 1308 introduces a fault condition between electrical phases a and b at the first sensors block 812, the second sensors block 813, and the three-phase electrical load subsystem block 814. For example, before simulation time two seconds (2 s) of the model 1300, the fault block 1308 represents a large resistance, e.g., the unfaulted condition. At and after simulation time 2 s, the fault block 1308 represents a small resistance, e.g., the faulted or short-circuited condition.

Figure 13B:
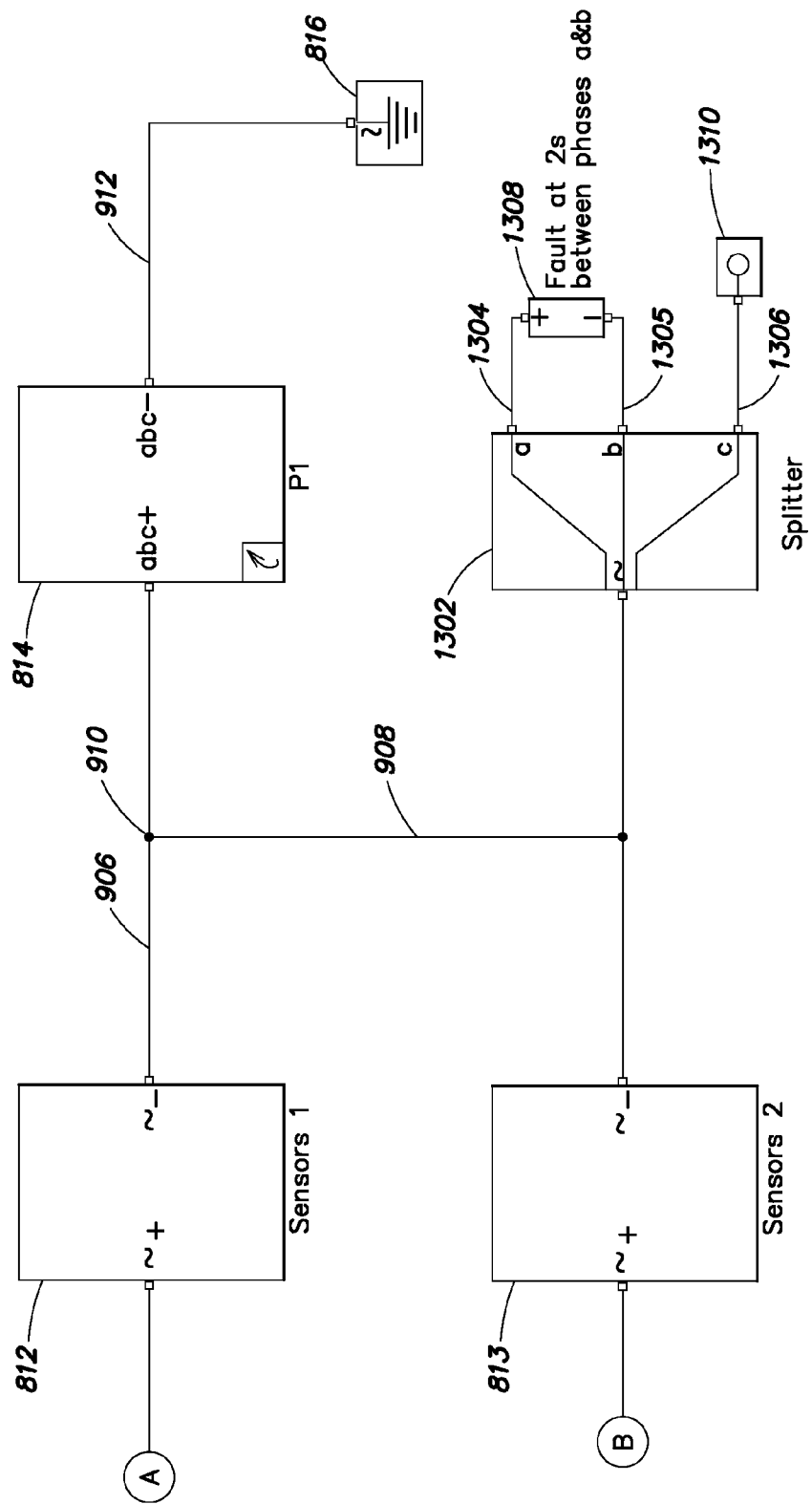
Figure 14A:
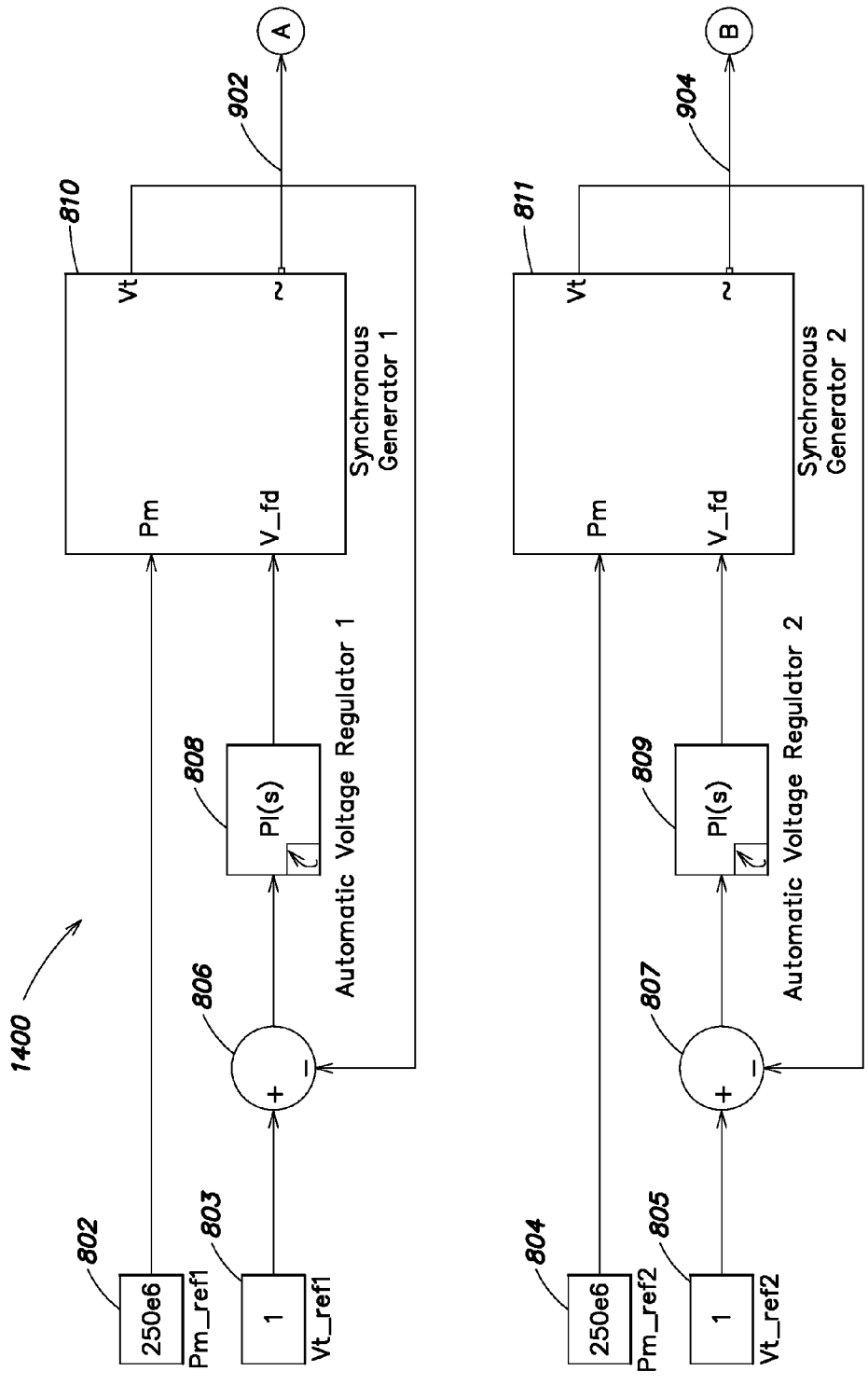
FIGS. 14A and B are an illustration of a graphical model having a simulated fault condition in accordance with an embodiment of the present invention.
Figure 14B:
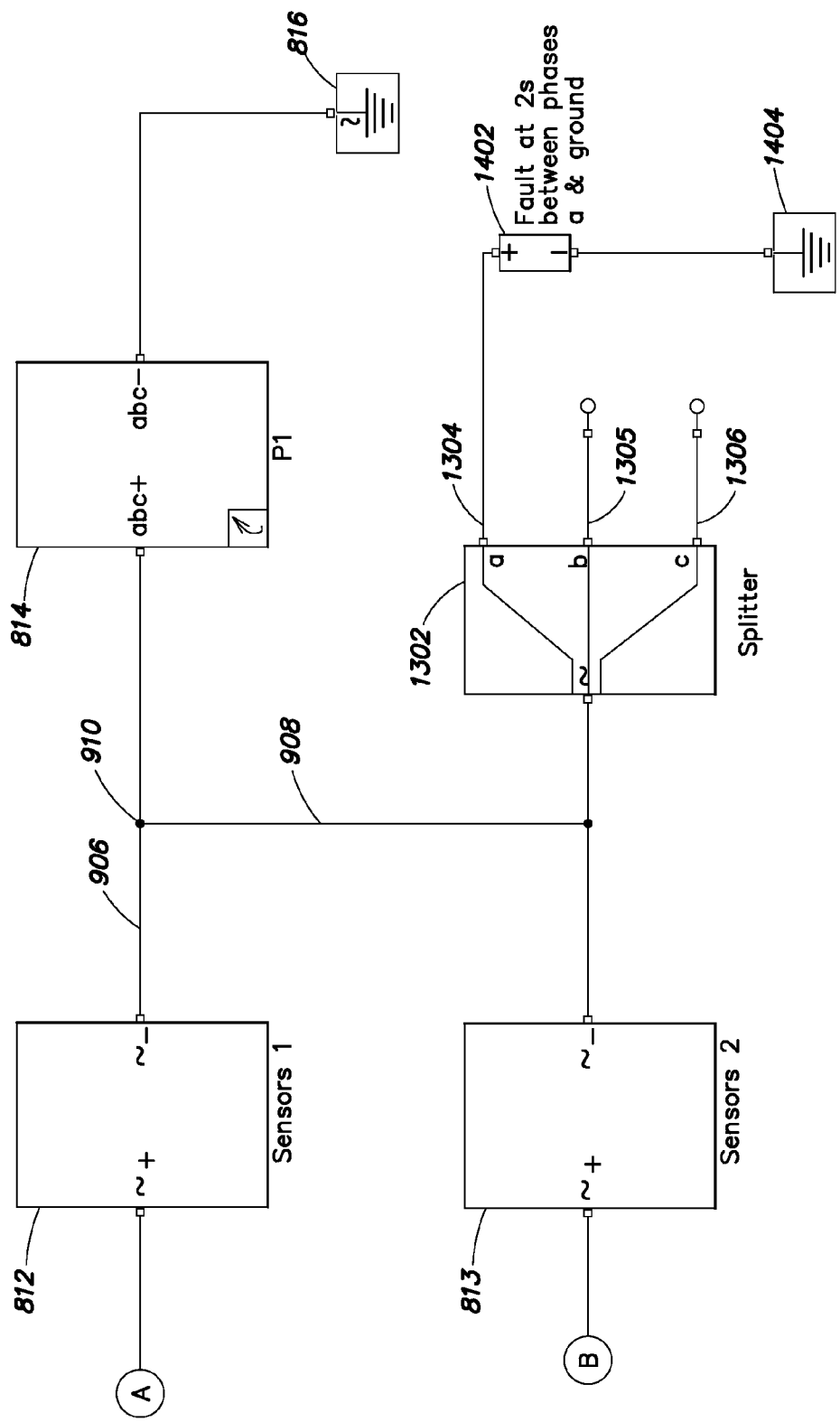

Nonetheless, other physical connections of the model 1300, however, are displayed in the single line mode. For example, the model 1300 includes composite connection lines 902, 904, 906, 908, and 912. In other words, it is only in that portion of the model where the fault condition is introduced that is shown in the multi-line mode. The remaining portions of the model are presented in the single line model FIGS. 14A and B are a schematic illustration of a graphical model 1400, which is similar to model 1300 (FIGS. 13A and B). The model 1400 includes a fault block 1402 that is connected to the first individual connection line 1304 of the splitter block 1302, and a ground block 1404. The fault block 1402 may operate in a similar manner to the fault block 1308 (FIG. 13B) of the graphical model 1300. That is, the fault block 1402 may initially represent a large resistance, e.g., the unfaulted condition, for a predetermined portion of the simulation time of the graphical model 1400, e.g., 2 s. Then, at and after the predetermined portion of the simulation time, e.g., 2 s, the fault block 1402 may represent a small resistance, e.g., the faulted or short-circuited condition.

Figure 15:
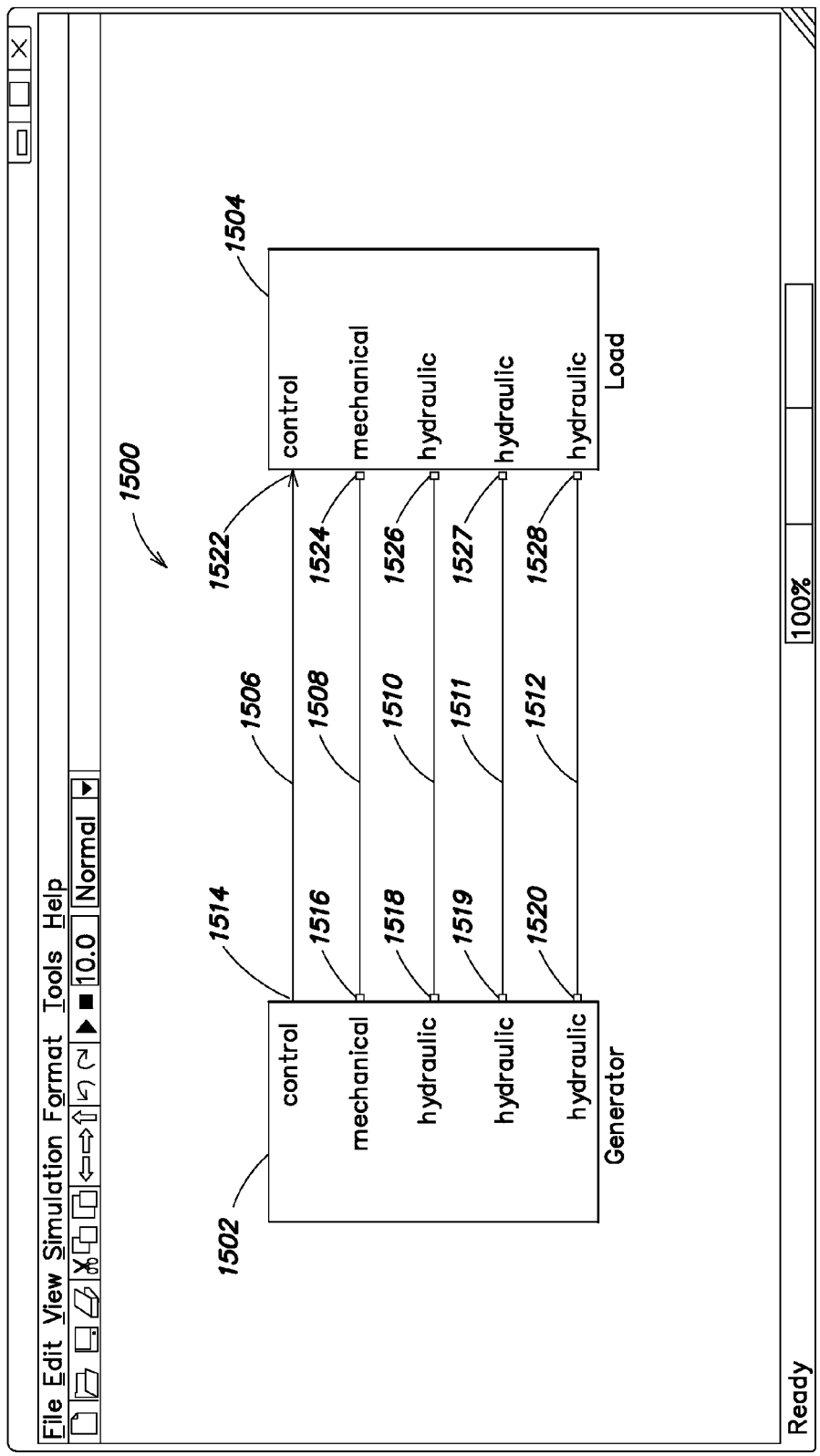
FIG. 15 is an illustration of a graphical model presented in a multi-line mode in accordance with an embodiment of the present invention.

In an embodiment, a composite connection line may aggregate lines from different modeling domains. FIG. 15 is a schematic illustration of a graphical model 1500. The graphical model 1500 includes a source block 1502 and a load block 1504. Blocks 1502, 1504 may be subsystem blocks and may contain one or more blocks operating according to a time-based modeling domain, and one or more blocks operating according to a physical modeling domain. In particular, the one or more blocks operating according to the physical modeling domain may include one or more blocks that operate in a mechanical physical sub-domain, and one or more blocks that operate in a hydraulic physical sub-domain. The blocks 1502, 1504 may be connected by a plurality of connections. In particular, the blocks 1502, 1504 may be connected by an arrow 1506 that represents a time-varying signal. In addition, the blocks 1502, 1504 may be connected by an individual mechanical connection line 1508 that may represent a mechanical connection, and three individual hydraulic connection lines 1510-1512 that represent hydraulic connections, e.g., low, medium and high pressure hydraulic lines. The source block 1502 may include a time-based port 1514, a mechanical physical connection port 1516, and three individual hydraulic connection ports 1518-1520. The load block 1504 may include a time-based port 1522, a physical connection port 1524, and three individual hydraulic connection ports 1526-1528. Model 1500 is presented in the multi-line model.

Figure 16:
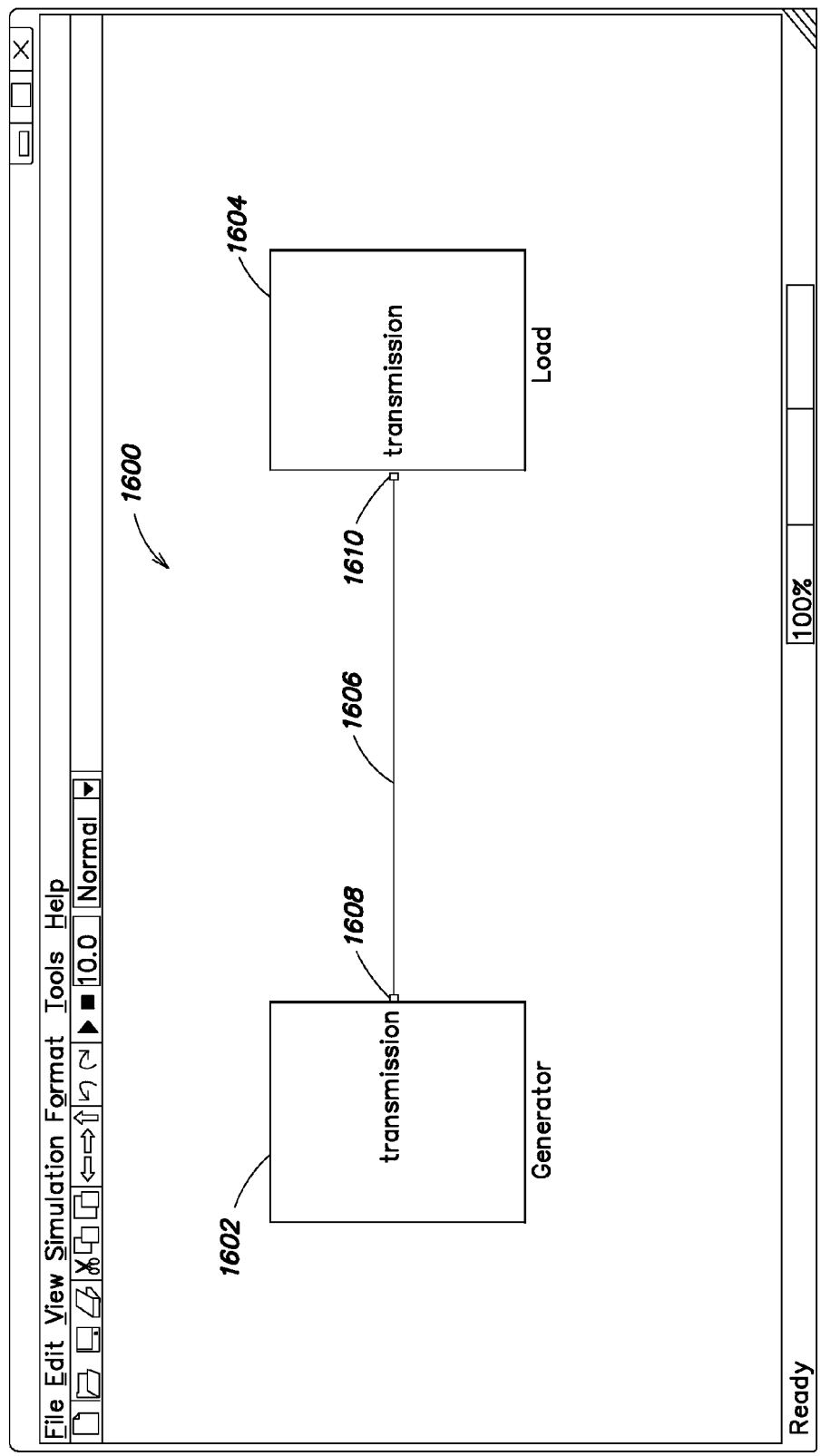
FIG. 16 is an illustration of the graphical model of FIG. 15 presented in a single line mode in accordance with an embodiment of the present invention.

FIG. 16 is a schematic illustration of a graphical model 1600 that is similar to model 1500 (FIG. 15), but is presented in a second single line model. The model 1600 includes a source block 1602 and a load block 1604. Blocks 1602, 1604 may be subsystem blocks and may contain one or more blocks operating according to a time-based modeling domain, and one or more blocks operating mechanical and hydraulic physical modeling sub-domains. In this embodiment, the time-varying signal arrow 1506 (FIG. 15), the individual mechanical physical connection line 1508, and the three individual hydraulic connection lines 1510-1512 are all replaced with a single multi-domain composite connection line 1606 that represents the time-varying signal connection and the physical modeling connections between the two blocks 1602, 1604. The source block 1602 includes a single multi-domain connection port 1608, and the load block 1604 includes a single multi-domain connection port 1610. As shown, the multi-domain composite connection line 1606 may represent individual connections from different modeling domains and sub-domains.

It should be understood that the multi-domain composite connection line may represent connections from other combinations of modeling domains, such as state-based modeling domains, dataflow-based modeling domains, frequency-based modeling domains, etc.

In an embodiment, the switching unit 216 may receive a selection, such as a user-selection, of the connections 1506, 1508, and 1510-1512 (FIG. 15) to be aggregated into the multi-domain composite connection 1606 (FIG. 16). For example, a user may select the connections, e.g., with the mouse, and select an 'Aggregate' command from the 'Tools' menu. In another embodiment, aggregation may be performed in response to a textual command, for example entered by a user at a CLI. The command to aggregate connections 1506, 1508, and 1510-1512 may also occur programmatically.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. One or more non-transitory computer-readable media comprising program instructions, the program instructions when executed by a processing element operable to:
    present on a display an executable graphical model including a plurality of blocks;
    display a connection symbol extending between at least two blocks of the plurality of blocks of the executable graphical model, the connection symbol representing a group of individual physical connections between the at least two blocks that have related energy flows based on one or more properties of the at least two blocks;
    switch an appearance of the displayed connection symbol between a single composite connection symbol representing the group of individual physical connections and a plurality of separate connection symbols representing the individual physical connections of the group of individual physical connections based on received input indicating that
        the executable graphical model is to be displayed with the single composite connection symbol, or
        the executable graphical model is to be displayed with the plurality of separate connection symbols representing the individual physical connections; and
    generate a set of equations from the executable graphical model.

2. The one or more non-transitory computer-readable media of claim 1 wherein the at least two blocks represent physical elements, and
    are selected from the group consisting of electrical components, mechanical components, hydraulic components, thermal components, pneumatic components and magnetic components.

3. The one or more non-transitory computer-readable media of claim 1 wherein the at least two blocks represent electrical elements, and the group of individual physical connections represented by the connection symbol are
    electrical power phases,
    electrical poles, or
    electrical cable runs.

4. The one or more non-transitory computer-readable media of claim 1 wherein the at least two blocks represent hydraulic elements, and the group of individual physical connections represented by the connection symbol are hydraulic runs.

5. The one or more non-transitory computer-readable media of claim 1 wherein the at least two blocks represent mechanical elements, and the group of individual physical connections represented by the connection symbol are rotating mechanical shafts.

6. The one or more non-transitory computer-readable media of claim 1 further comprising instructions executable by a computing device to:
    receive a user selection as the received input through one or more graphical user interfaces to switch the appearance of the displayed connection symbol from the single composite connection symbol to the plurality of separate connection symbols or from the plurality of separate connection symbols to the single composite connection symbol.

7. The one or more non-transitory computer-readable media of claim 1 wherein the single composite connection symbol has a first style, and the plurality of separate connections symbols representing the individual physical connections have a second style different from the first style.

8. The one or more non-transitory computer-readable media of claim 1 further comprising instructions executable by a computing device to:
    provide each of the at least two blocks with a single respective port when the displayed connection symbol appears as the single composite connection symbol, and
    provide each of the at least two blocks with a plurality of respective ports when the displayed connection symbol appears as the plurality of separate connection symbols representing the individual physical connections.

9. The one or more non-transitory computer-readable media of claim 1 wherein the group of physical connections share a common attribute.

10. The one or more non-transitory computer-readable media of claim 1 wherein the group of physical connections are identified by one or more property settings associated with one or more of the at least two blocks of the executable graphical model.

11. A one or more non-transitory computer-readable media comprising program instructions, the program instructions when executed by a processing element operable to:
    present an executable graphical model on a display, the executable graphical model including a plurality of blocks defining equations;
        display composite connectors between pairs of interconnected blocks, each composite connector
        representing a group of physical connections, between a particular pair of interconnected blocks, that have related energy flows based on one or more properties of the particular pair of interconnected blocks, and appearing in the executable graphical model as a single composite connection symbol; and
    change the appearance of one or more of the composite connectors in a portion of the executable graphical model from the single composite connection symbol to a set of individual connection symbols based on received input indicating that the executable graphical model should be displayed with the set of individual connection symbols, where
        each individual connection symbol in the set of individual connection symbols represents one of the physical connections of the group, and
        the change occurs without a user re-drawing the one or more composite connectors.

12. The one or more non-transitory computer-readable media of claim 11 wherein
    one or more blocks of the executable graphical model have a type, and
    a number of physical connections represented by a given composite connector is a function of the types of the one or more blocks interconnected by the given composite connector.

13. The one or more non-transitory computer-readable media of claim 11 further comprising instructions executable by a computing device to:
    receive a designation of the portion of the executable graphical model.

14. The one or more non-transitory computer-readable media of claim 13 wherein the designation is received from the user.

15. The one or more non-transitory computer-readable media of claim 11 wherein at least one of the composite connectors further represents one or more of a time-varying signal, a state change event, a flow of data, or a flow of control.

16. A one or more non-transitory computer-readable media comprising program instructions, the program instructions when executed by a processing element operable to:
- present an executable graphical model on a display, the executable graphical model including a plurality of blocks defining equations;
- display a composite connector between at least two blocks of the plurality of blocks of the executable graphical model, the composite connector representing a plurality of physical connections between the at least two blocks that have related energy flows based on one or more properties of the at least two blocks, and the composite connector appearing as a single line; and
- insert an interface block into the composite connector, the interface block including
  - a first interface connected to a first of the at least two blocks via the composite connector appearing as a single composite connection symbol, and
  - a second interface connected to a second of the at least two blocks via a plurality of individual connection symbols, the individual connection symbols representing ones of the plurality of physical connections.

17. The one or more non-transitory computer-readable media of claim 16 further comprising instructions executable by a computing device to:
- connect to one of the plurality of individual connection symbols a block representing a simulated fault.

18. The one or more non-transitory computer-readable media of claim 16 further comprising instructions executable by a computing device to:
- receive a selection of the second of the at least two blocks, wherein the interface block is inserted in response to the received selection.

19. The one or more non-transitory computer-readable media of claim 18 wherein the selection is a user-selection.

20. The one or more non-transitory computer-readable media of claim 16 wherein the second of the least two blocks has a port coupled to the composite connector, the medium further comprising instructions executable by a computing device to:
- provide the second of the least two blocks with a plurality of ports, the plurality of ports connected to respective ones of the plurality of individual connection symbols.

21. A method comprising:
- receiving user input drawing, on a display, a connection symbol between two components of an executable graphical model for which one or more equations are derived for solving the executable graphical model, the connection symbol representing a collection of associated individual physical connections between the two components that have related energy flows based on one or more properties of the two components, and the connection symbol appearing as a single composite connection symbol; and
- changing an appearance of the connection symbol from the single composite connection symbol to a plurality of separate connection symbols based on received input, the plurality of separate connection symbols representing the collection of associated individual physical connections between the two components, wherein the change occurs without a user re-drawing the connection symbol.

22. The method of claim 21 wherein the connection symbol is nested within a hybrid connection between the two components, the hybrid connection including a connection representing a time-based, mathematical relationship between the two components.

23. The method of claim 22 further comprising:
- providing each of the two components with a single respective port when the connection symbol appears as the single composite connection symbol, and
- providing each of two components with a plurality of respective ports when the connection symbol appears as the plurality of separate connection symbols representing the collection of associated individual physical connections.

24. A one or more non-transitory computer-readable media comprising program instructions, the program instructions when executed by a processing element operable to:
- present an executable graphical model on a display, the graphical model including a plurality of blocks;
- generate a set of equations for the executable graphical model;
- display a connection symbol extending between at least two blocks of the plurality of blocks of the executable graphical model, the connection symbol representing a plurality of physical connections between the at least two blocks that have related energy flows based on one or more properties of the at least two blocks; and
- switch the connection symbol, in response to received input, between a single composite connection symbol that hides the plurality of physical connections, and a plurality of separate connection symbols that visually exposes each of the physical connections.

25. The non-transitory computer-readable medium of claim 24 wherein the connection symbol is nested within a hybrid connection between the at least two blocks, the hybrid connection including a connection representing a time-based, mathematical relationship between the at least two blocks.

26. An apparatus for simulating a physical system comprising:
- a display; and
- processing logic coupled to the display,
- wherein the processing logic is programmed to:
  - present on the display an executable graphical model including a plurality of blocks that represent physical elements,
  - present on the display a plurality of individual connection symbols extending between at least two blocks of the plurality of blocks of the executable graphical model, the plurality of individual connection symbols representing physical connections between the at least two blocks that have related energy flows based on one or more properties of the at least two blocks,
  - switch the plurality of individual connection symbols to a single composite connection symbol representing the plurality of individual connection symbols based on first received input,
  - switch the single composite connection to the plurality of individual connection symbols based on second received input,
  - generate a set of equations from the executable graphical model, and solve the set of equations to simulate the physical system.

27. The apparatus of claim 26 wherein the plurality of individual connection symbols represent energy flows between the at least two blocks.

28. The apparatus of claim 27 wherein at least one of the energy flows is based on a product of a through variable and an across variable of one or more of the at least two blocks.

29. A method comprising:
presenting on a display of a computing device an executable graphical model including a plurality of blocks,
displaying a connection symbol extending between at least two blocks of the plurality of blocks of the executable graphical model, the connection symbol representing a group of individual physical connections between the at least two blocks that have related energy flows based on one or more properties of the at least two blocks;
switching an appearance of the displayed connection symbol between a single composite connection symbol representing the group of individual physical connections and a plurality of separate connection symbols representing the individual physical connections of the group of individual physical connections based on received input indicating that
the executable graphical model is to be displayed with the single composite connection symbol, or
the executable graphical model is to be displayed with the plurality of separate connection symbols representing the individual physical connections; and
generating a set of equations from the executable graphical model.

30. The method of claim 29 wherein the connection symbol is nested within a hybrid connection between the at least two blocks, the hybrid connection including a connection representing a time-based, mathematical relationship between the at least two blocks.

31. The method of claim 29 further comprising:
providing each of the at least two blocks with a single respective port when the displayed connection symbol appears as the single composite connection symbol, and
providing each of the at least two blocks with a plurality of respective ports when the displayed connection symbol appears as the plurality of separate connection symbols representing the individual physical connections.

32. An apparatus for simulating a physical system comprising:
a display; and
processing logic coupled to the display,
wherein the processing logic is programmed to:
receive user input drawing, on the display, a connection symbol between two components of an executable graphical model for which one or more equations are derived for solving the executable graphical model, the connection symbol representing a collection of associated individual physical connections between the two components that have related energy flows based on one or more properties of the two components, and the connection symbol appearing as a single composite connection symbol, and
change an appearance of the connection symbol from the single composite connection symbol to a plurality of separate connection symbols based on received input, the plurality of separate connection symbols representing the collection of associated individual physical connections between the two components, wherein the change occurs without a user re-drawing the connection symbol.

33. The apparatus of claim 32 wherein the connection symbol is nested within a hybrid connection between the two components, the hybrid connection including a connection representing a time-based, mathematical relationship between the two components.

34. The apparatus of claim 32 wherein the processing logic is further programmed to:
provide each of the two components with a single respective port when the connection symbol appears as the single composite connection symbol, and
provide each of the two components with a plurality of respective ports when the connection symbol appears as the plurality of separate connection symbols representing the collection of associated individual physical connections.

35. A method comprising:
presenting an executable graphical model on a display, the executable graphical model including a plurality of blocks defining equations;
displaying a composite connector between at least two blocks of the plurality of blocks of the executable graphical model, the composite connector representing a plurality of physical connections between the at least two blocks that have related energy flows based on one or more properties of the at least two blocks, and the composite connector appearing as a single line; and
inserting an interface block into the composite connector, the interface block including
a first interface connected to a first of the at least two blocks via the composite connector appearing as a single composite connection symbol, and
a second interface connected to a second of the at least two blocks via a plurality of individual connection symbols, the plurality of individual connection symbols representing ones of the plurality of physical connections.

36. The method of claim 35 further comprising receiving a selection of the second of the at least two blocks, wherein the interface block is inserted in response to the received selection.

37. The method of claim 35 wherein the composite connector is nested within a hybrid connection between the at least two blocks, the hybrid connection including a connection representing a time-based, mathematical relationship between the at least two blocks.

38. An apparatus for simulating a physical system comprising:
a display; and
processing logic coupled to the display,
wherein the processing logic is programmed to:
present an executable graphical model on the display, the executable graphical model including a plurality of blocks defining equations;
display a composite connector between at least two blocks of the plurality of blocks of the executable graphical model, the composite connector representing a plurality of physical connections between the at least two blocks that have related energy flows based on one or more properties of the at least two blocks, and the composite connector appearing as a single line; and
insert an interface block into the composite connector, the interface block including a first interface connected to a first of the at least two blocks via the composite connector appearing as a single composite connection symbol, and a second interface connected to a second of the at least two blocks via a plurality of individual connection symbols, the plurality of individual connection symbols representing ones of the plurality of physical connections.

39. The apparatus of claim 38 wherein the processing logic is further programmed to receive a selection of the second of the at least two blocks, wherein the interface block is inserted in response to the received selection.

40. The apparatus of claim 38 wherein the composite connector is nested within a hybrid connection between the at least two blocks, the hybrid connection including a connection representing a time-based, mathematical relationship between the at least two blocks.

* * * * *